United States Patent
Gunji et al.

(10) Patent No.: US 9,699,384 B2
(45) Date of Patent: Jul. 4, 2017

(54) IMAGE SIGNAL PROCESSING APPARATUS AND A CONTROL METHOD THEREOF, AND AN IMAGE PICKUP APPARATUS AND A CONTROL METHOD THEREOF

(71) Applicant: CANON KABUSHIKI KAISHA, Tokyo (JP)

(72) Inventors: Koichi Gunji, Yokohama (JP); Hidetoshi Onuma, Yokohama (JP); Yasuyuki Tanaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/857,063

(22) Filed: Sep. 17, 2015

(65) Prior Publication Data

US 2016/0006942 A1    Jan. 7, 2016

Related U.S. Application Data

(62) Division of application No. 14/146,244, filed on Jan. 2, 2014, now Pat. No. 9,432,582.

(30) Foreign Application Priority Data

Jan. 4, 2013   (JP) .................................. 2013-000157
Feb. 5, 2013   (JP) .................................. 2013-020333

(51) Int. Cl.
*H04N 5/232*    (2006.01)
*H04N 5/262*    (2006.01)
*H04N 9/77*     (2006.01)

(52) U.S. Cl.
CPC ..... *H04N 5/23293* (2013.01); *H04N 5/23235* (2013.01); *H04N 5/2628* (2013.01); *H04N 9/77* (2013.01)

(58) Field of Classification Search
CPC ........... H04N 5/23293; H04N 5/23235; H04N 5/2628; H04N 9/77; H04N 19/59
(Continued)

(56) References Cited

U.S. PATENT DOCUMENTS

2007/0071361 A1*  3/2007  Sanno ................ H04N 5/23293
                                                        382/298
2011/0298962 A1* 12/2011  Shiohara ............ H04N 5/23235
                                                        348/333.02

(Continued)

FOREIGN PATENT DOCUMENTS

JP    2008-219317 A    9/2008
JP    2009-159067 A    7/2009

(Continued)

OTHER PUBLICATIONS

The above references were cited in a Sep. 13, 2016 Japanese Office Action, a copy of which is enclosed without an English Translation, that issued in Japanese Patent Application No. 2013-000157.

*Primary Examiner* — Nhan T Tran
(74) *Attorney, Agent, or Firm* — Cowan, Liebowitz & Latman, P.C.

(57) ABSTRACT

An image pickup apparatus includes a first image reduction unit configured to reduce the size of an image output by an image pickup element, a memory configured to store the image reduced by the first image reduction unit, an external output unit configured to output the image stored in the memory, a display configured to display an image being shot, a second image reduction unit configured to reduce, to the display size on the display, the image reduced by the first image reduction unit, without causing the reduced image to be stored in the memory and a signal processor for the display configured to perform signal processing of the image reduced to the display size on the display.

20 Claims, 26 Drawing Sheets

(58) Field of Classification Search
USPC .......................... 348/333.01, 231.99, 222.1
See application file for complete search history.

(56) References Cited

U.S. PATENT DOCUMENTS

| | | | | |
|---|---|---|---|---|
| 2012/0092542 A1* | 4/2012 | Kitano | ............... | H04N 5/23293 348/333.01 |
| 2012/0320231 A1* | 12/2012 | Suito | .................. | H04N 5/23245 348/222.1 |
| 2013/0162881 A1* | 6/2013 | Sengoku | ............ | H04N 5/23293 348/333.11 |
| 2014/0078338 A1* | 3/2014 | Hatano | .................. | H04N 9/045 348/222.1 |
| 2014/0125839 A1* | 5/2014 | Shiohara | ............ | H04N 5/23293 348/229.1 |

FOREIGN PATENT DOCUMENTS

| | | |
|---|---|---|
| JP | 2010-268388 A | 11/2010 |
| WO | 2012/164896 A1 | 6/2012 |

\* cited by examiner

IMAGE SIGNAL PROCESSING APPARATUS AND A CONTROL METHOD THEREOF, AND AN IMAGE PICKUP APPARATUS AND A CONTROL METHOD THEREOF

CROSS-REFERENCE TO RELATED APPLICATIONS

This application is a divisional of application Ser. No. 14/146,244, filed Jan. 2, 2014 the entire disclosure of which is hereby incorporated by reference.

BACKGROUND OF THE INVENTION

Field of the Invention

The present invention relates to an image pickup apparatus including a display for displaying an image being shot.

Description of the Related Art

Conventionally, in the field of image pickup apparatuses such as digital video cameras and digital cameras, those with displays for use in checking of object images being shot, such as liquid crystal or organic electro luminescence displays (panels) or electronic view finders (EVFs), have been widely diffused.

The use of a display allows display of an object image being shot by a user, i.e., an image being recorded, on the display screen in real time with a predetermined image quality. However, the recent increase in the number of, pixels of a recorded image, and of image quality improvement functions has led to an elongated signal processing time, which in turn causes a display delay. A display delay causes the user to get an awkward feeling during camera operations such as panning, tilting, and zooming. This makes it difficult for the user to check a composition or a focus state.

The display delay amount depends also on the shooting frame frequency. The lower the frame frequency, the larger the delay amount is. Depending on the configuration of an image pickup apparatus, for example, if the frame rate is 24 Hz, the delay amount is two and a half times larger than in the case where the frame rate is 60 Hz.

Television apparatuses also suffer like problems due to the increased number of image quality improvement functions. Image quality improvement functions performed by a television apparatus when a game is played with the television apparatus being connected to a game player may result in a display delay of multiple frame times. This display delay results in a change in the results of the game or cause the user to get an awkward feeling. In order to reduce display delay, two methods are proposed in Japanese Patent No. 4691193. One is the method for performing processing to decrease display delay with simplified image quality improvement processes, and the other is the control method for concurrently performing the recording and reading of a frame memory.

However, the configuration described in Japanese Patent No. 4691193 is not intended for image pickup apparatuses, but for video display devices for displaying input signals such as televisions, and thus inevitably causes a delay time of one frame or more. Conventional technologies have, in their applications to image pickup apparatuses and other similar apparatuses, difficulties in the reduction of display delay time which occurs when an image being shot is displayed on their display devices.

SUMMARY OF THE INVENTION

In light of such problems, it is an object of the present invention to reduce a display delay time which occurs when an image being shot is displayed on the display, thereby eliminating the user's awkward feeling caused by the display delay.

An image pickup apparatus as an aspect of the present invention includes a first image reduction unit configured to reduce the size of an image output by an image pickup element, a memory configured to store the image reduced by the first image reduction unit, an external output unit configured to output the image stored in the memory, a display configured to display an image being shot, a second image reduction unit configured to reduce, to the display size on the display, the image reduced by the first image reduction unit, without causing the reduced image to be stored in the memory, and a signal processor for the display configured to perform signal processing of the image reduced to the display size on the display.

An image signal processing apparatus as another aspect of the present invention includes a plurality of signal processors, each of the signal processors being configured to process, in its corresponding at least one frame period, an input image signal, the image signal processing apparatus including a memory configured to store, in each frame period, the image signal processed by the signal processors, an output unit configured to read and output the image signal stored in the memory, a signal processor for the display arranged in parallel relative to the signal processors, and configured to change the image size of the image signal to an image size intended for display and then to output the image signal, and a controller configured to control the synchronization timing of the first frame frequency of the output image signal and the synchronization timing of the second frame frequency of the image signal whose image size is intended for display.

An image pickup apparatus as yet another aspect of the present invention includes an image pickup unit, a plurality of signal processors, each of the signal processers configured to process, in its corresponding at least one frame period, an image signal output by the image pickup unit, and a display configured to display an image being shot, the image pickup apparatus including a memory configured to store, in each frame period, the image signal processed by the signal processors, an output unit configured to read and output the image signal stored in the memory, a signal processor for the display arranged in parallel relative to the signal processors, and configured to change the image size of the image signal to an image size intended for display and then to output the image signal on the display, and a controller configured to control the synchronization timing of the first frame frequency corresponding to the driving cycle of the image pickup unit and the synchronization timing of the second frame frequency corresponding to the driving cycle of the display.

A control method of the image signal processing apparatus performed by the image signal processing apparatus, the image signal processing apparatus including the signal processors, each of the signal processors being configured to process, in its corresponding at least one frame period, an input image signal as still another aspect of the present invention includes the steps of storing, in each frame period, the image signal processed by the signal processors, reading and outputting the image signal stored in the memory, changing the image size of the image signal to an image size intended for display and then outputting the image signal by the signal processor for the display arranged in parallel relative to the signal processors, and controlling the synchronization timing of the first frame frequency of the input image signal and the synchronization timing of the second frame frequency of the image signal whose image size is intended for display.

A control method of the image pickup apparatus including the image pickup unit, the signal processors, each of the signal processers configured to process, in its corresponding at least one frame period, an image signal output by the image pickup unit, and the display configured to display an image being shot as still yet another aspect of the present invention includes the steps of storing in the memory, in each frame period, the image signal processed by the signal processors, reading and outputting the image signal stored in the memory, changing the image size of the image signal to an image size intended for display and then outputting the image signal on the display by the signal processor for the display arranged in parallel relative to the signal processors, and controlling the synchronization timing of the first frame frequency corresponding to the driving cycle of the image pickup unit and the synchronization timing of the second frame frequency corresponding to the driving cycle of the display.

Further features of the present invention will become apparent from the following description of exemplary embodiments with reference to the attached drawings.

DESCRIPTION OF THE PREFERRED EMBODIMENTS

Figure 1:
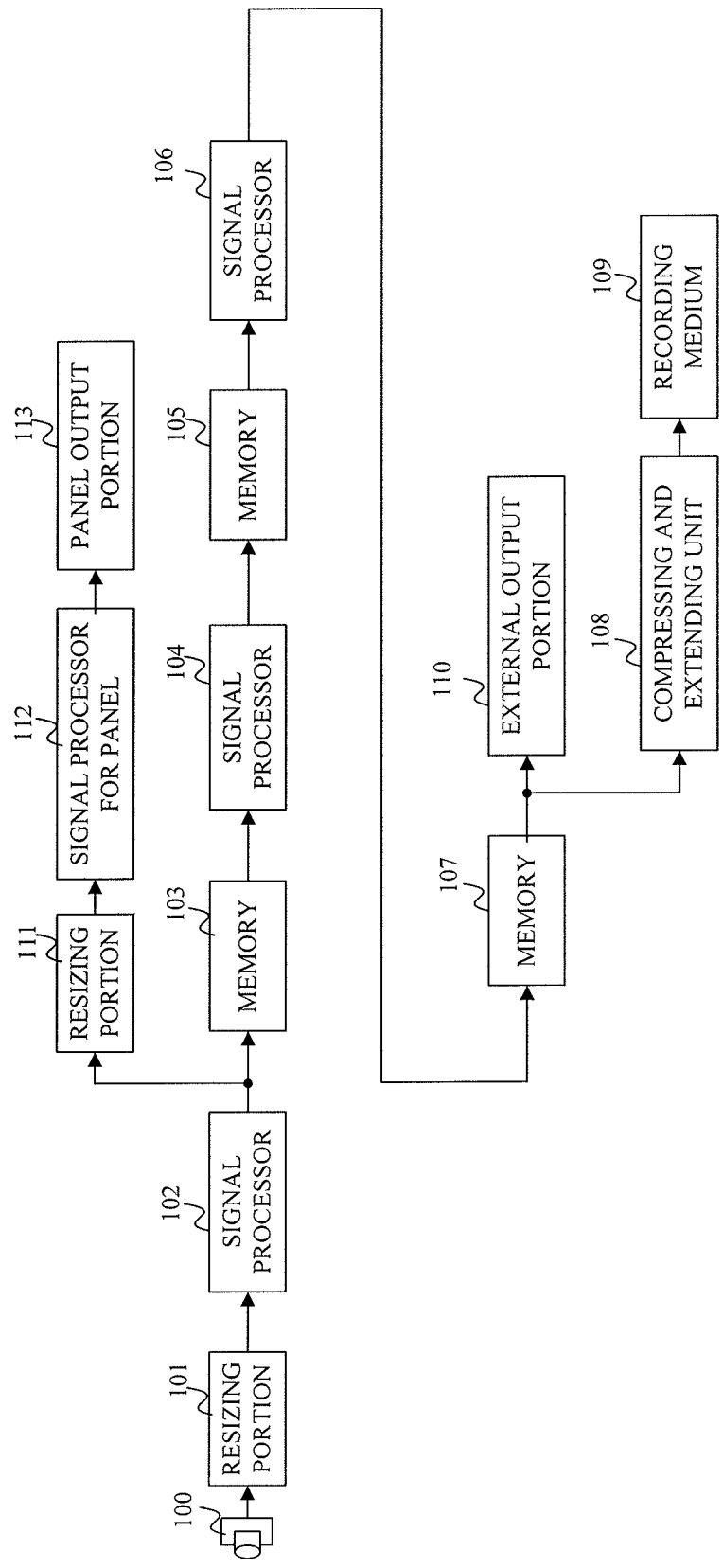
FIG. 1 is a function configuration block diagram illustrating an example of the connection of a main datapath of Embodiment 1 of the present invention.

A detailed description will be given of preferred embodiments of the present invention with reference to the attached drawings. In each figure, the same reference numeral will be given to each of the same members, and the overlapped portions of the explanation will be omitted.

[Embodiment 1]

This embodiment will describe a configuration in which reduces display delay by connecting an YCC signal extracted from a portion of a signal processing circuit for recorded image to a processing circuit for displayed image, with an example being a video camera.

First, a description will be given of the function configuration of this embodiment with reference to the function configuration block diagram of FIG. 1.

A sensor 100 is an image pickup element such as a CCD or CMOS sensor. The sensor 100 adjusts an incident light intensity and a focus state with a group of objective lenses (not illustrated in the figure), photoelectrically converts a formed image, and then outputs the image as a digitalized signal. The image pickup element has, at its each pixel, a color filter of R (red), G (green), or B (blue) which is arranged in a predetermined array, e.g., a bayer or honeycomb array, and used to produce an R, G, or B image signal, respectively. For high speed output, an RGB image signal is output, in some cases, by performing a pixel combination processing in which multiple pixels are combined into one pixel to reduce the size of an output image.

A resizing portion (first image reduction portion) 101 reduces the size of an R, G, or B image signal output by the sensor 100 to a size processable by a signal processor 102, while correcting the barycenter of each of R (red), G (green), and B (blue).

The signal processor 102 receives R, G, and B image signals and then performs offset adjustment, gain adjustment, and gamma correction for them. Then it converts each of the image signals into a luminance signal (Y) and color difference signals (Cb, Cr) and writes an YCC image signal in a memory 103.

A signal processor 104 reads the YCC image signal from the memory 103, performs several processing, for example correction processing for the distortion of the lens, and vibration proof processing for the image pickup apparatus, and then write the processed YCC image signal in a memory 105.

A signal processor 106 reads the YCC image signal from the memory 105, performs several processing, for example noise reduction processing, and then write the processed YCC image signal in a memory 107.

A compressing and extending unit 108 reads the YCC image signal from the memory 107, performs compression coding of the YCC image signal in conformity with a recording format, and then write the coded YCC image signal in a recording medium 109.

An external output portion 110 reads the YCC image signal from the memory 107, converts the format of the YCC image signal in conformity with HDMI, SDI, and a transmission format for image signal such as component video signal and composite video signal, and then outputs the converted YCC image signal to the outside of the image pickup apparatus.

A resizing portion (second image reduction portion) 111 reduces the size of an YCC image to the display size on a panel, which is a display, by using the YCC image signal output by the signal processor 102. When the size of the YCC image is reduced, an image band is controlled by a band limiting filter in both horizontal and vertical directions relative to the YCC image to prevent aliasing of the YCC image. Thereafter, the size of the YCC image is reduced by interpolation method such as bi-cubic interpolation.

A signal processor for panel (signal processor for display) 112 receives the YCC image which is output by the resizing portion 111 and whose size is reduced to the display size on the panel, and then performs several processing for the reduced YCC image, such as color adjustment processing and resolution adjustment processing, in conformity with the specifications of the panel.

A panel output portion 113 transmits the image signal whose format is converted in conformity with the receiving format of the panel to the panel to cause the YCC image to be displayed.

Figure 21A:
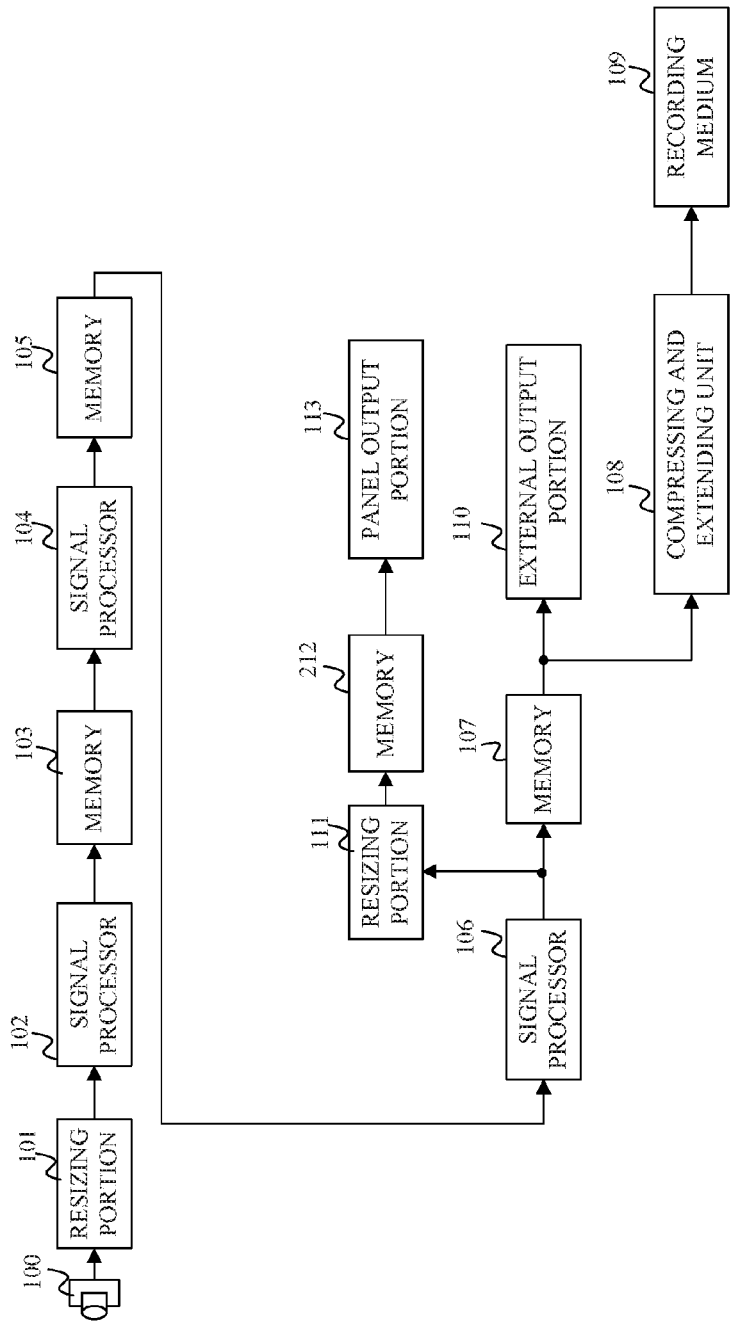
FIGS. 21A to 21C are function configuration block diagrams of conventional art.

Conventionally, as illustrated in the function configuration block diagram of FIG. 21A, the resizing portion 111 received, from the signal processor 106, an YCC image signal for which all processing intended for recorded image is performed except for compressing and extension processing, and then the YCC image signal was stored in a memory 212. After that, the panel output portion 113 transmitted the image signal read from the memory 212 to the panel to cause an image to be displayed.

Figure 2:
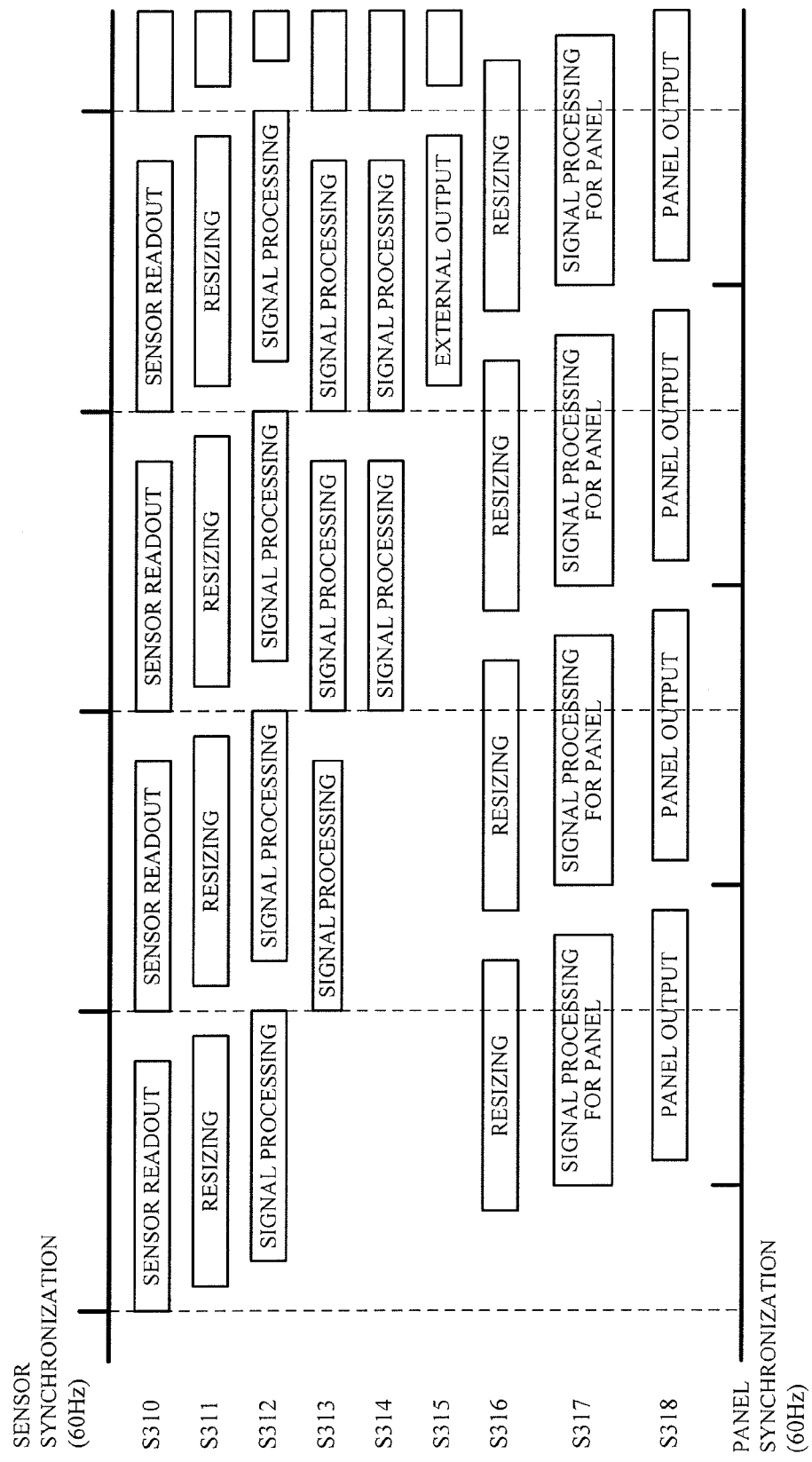
FIG. 2 is a diagram illustrating an example of the operation timing chart of Embodiment 1.

Next, a description will be given of operation timing, referring to FIG. 2 which illustrates the operation timing chart of this embodiment.

In this embodiment, the driving cycle of the sensor 100 and that of the panel synchronize at 60 Hz. As illustrated in FIG. 2, this synchronization occurs such that the synchronization timing of the panel is later compared with that of the sensor 100. The number of pixels of the sensor 100 is 4096 (H)×2160 (V)=8847360 pixels, and that of the panel is 960 pixels (H)×540 lines (V)=518400 pixels.

At step S310, the sensor 100 outputs an RGB image signal (4096 pixels (H)×2160 lines (V)).

At step S311, the resizing portion 101 reduces the size of the RGB image signal output by the sensor 100 to a size processable by the signal processor 102 (2048 pixels (H)×1080 lines (V)).

At step S312, the signal processor 102 converts the reduced RGB image signal into a luminance signal (Y) and color difference signals (Cb, Cr). Noise reduction processing may be performed before the Y-C conversion. The converted YCC image signal is written in the memory 103 and transmitted to the resizing portion 111.

At step S313, the signal processor 104 reads the YCC image signal written in the memory 103 at step S312, one frame time later from the processing performed at step S312. The YCC image signal is written in the memory 105 after several processing such as the correction processing for the distortion of the lens and the vibration proof processing for the image pickup apparatus are performed.

At step S314, the signal processor 106 reads the YCC image signal written in the memory 105 at step S313, one frame time later from the processing performed at step S313. The YCC image signal is written in the memory 107 after the noise reduction processing is performed.

At step S315, the external output portion 110 reads the YCC image signal written in the memory 107 at step S314, one frame time later from the processing performed at step S314. After that, the external output portion 110 converts the format of the YCC image signal in conformity with HDMI, SDI, and a transmission format for image signal such as component video signal and composite video signal, and then outputs the converted YCC image signal to the outside of the image pickup apparatus.

In the case of the conventional configuration, the resizing portion 111 received an image from the signal processor 106, performed image reduction processing for the image, and then causes the image to be stored in the memory 212.

Figure 22A:
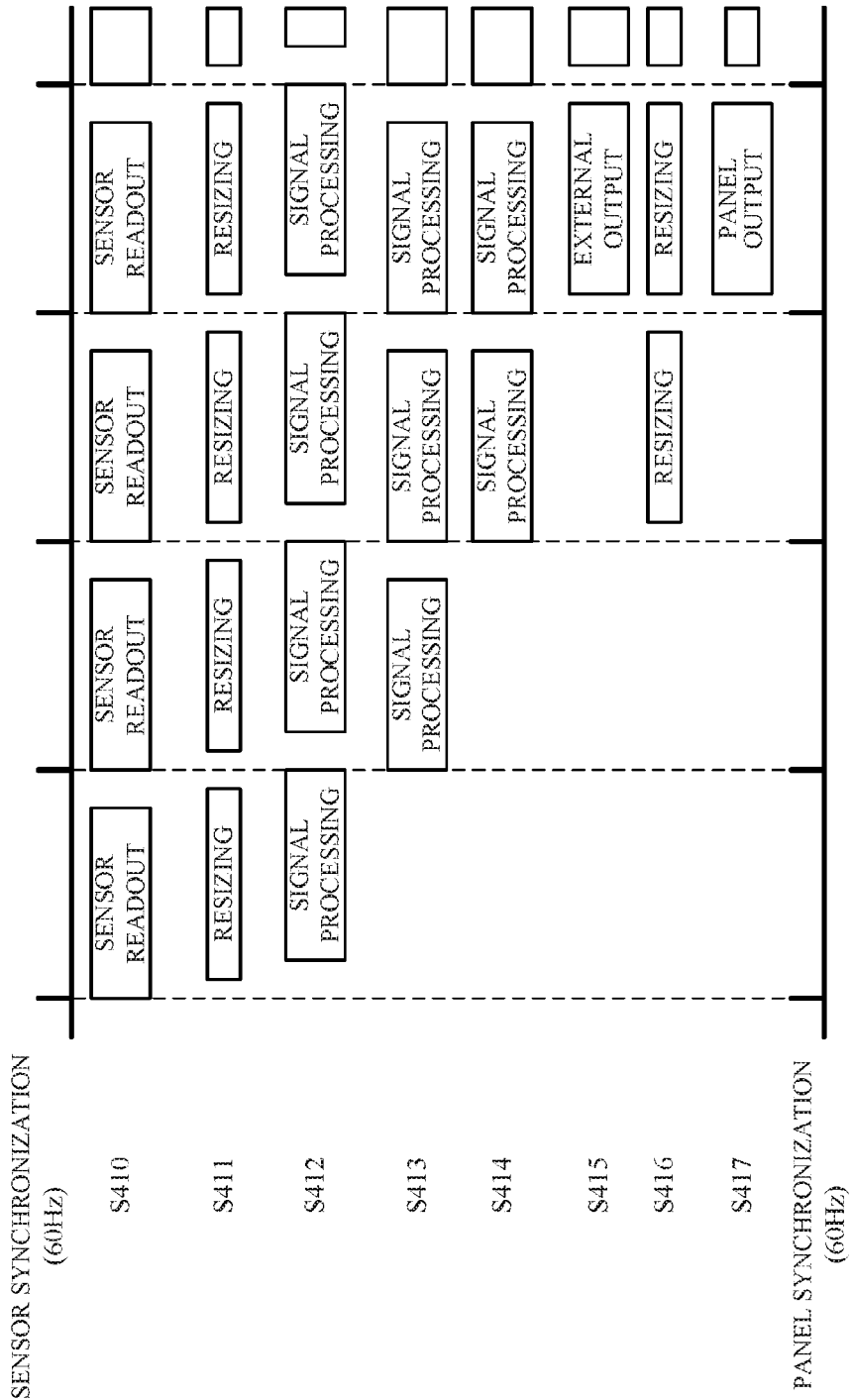
FIGS. 22A to 22D are diagrams illustrating an example of the operation timing chart of conventional art.

Thus, as illustrated in FIG. 22A, at step S416, the resizing portion 111 reduces the size of the YCC image signal transmitted from the signal processor 106 to the display size on the panel (960 pixels (H)×540 lines (V)).

After that, at step S417, the panel output portion 113 transmitted the image signal read from the memory 212 to the panel to cause an image to be displayed.

This means that there occurs, on the panel, a display delay of three frame times counting from step S410 due to the combination of the time required for step S415 and that required for the processing of output on the panel at step 417. If the frame rate is 60 Hz, a delay of about 50[ms] occurs.

For clarity, steps S410 to S415 correspond to steps S310 to S315.

In this embodiment, at step S316 following step S312, the resizing portion 111 reduces the size of the YCC image signal transmitted from the signal processor 102 to the display size on the panel (960 pixels (H)×540 lines (V)).

At step S317, the signal processor for panel 112 performs several processing such as color adjustment processing and resolution adjustment processing in conformity with the specifications of the panel.

At step S318, the panel output portion 113 transmits the image signal whose format is converted in conformity with the receiving format of the panel to the panel to cause the image to be displayed.

In the case of the configuration according to this embodiment, the process starting from the output of an RGB image signal from the sensor 100 ending with the display of an image on the panel is completed within one frame time. This makes it possible to reduce a display delay which occurs when an image being shot is displayed on the display device to one frame time or less.

Each memory includes a memory such as a DRAM. The configuration of each memory may be either one of the following: the configuration in which one memory is used with address control or the configuration in which a plurality of memories are used.

For clarity, although not illustrated in the figure, a controller for controlling the synchronization of the driving cycle of the sensor 100 and that of the panel is necessary. It is desirable for the controller to have a configuration in which each of the sensor 100 and the panel can control its driving cycle and delay time. More specifically, such a configuration should ensure that the driving delay amount of the synchronization signal of the driving cycle of the panel falls within a predetermined range on the basis of the driving cycle of the sensor 100 derived from the measurement of the delay amounts of the sensor 100 and the panel. The driving cycle of the sensor 100 and that of the panel are easy to control if they are the same length of cycle, but are not limited to such same length of cycle.

Although not illustrated in the figure, a control block for controlling each block, such as a CPU, is necessary. Such a control block needs to perform, in particular, signal processing and setting adjustment for signal processing for panel.

[Embodiment 2]

This embodiment will describe a configuration in which reduces display delay by connecting an RGB image signal extracted from a portion of the signal processing circuit for recorded image to the processing circuit for displayed image, with an example being a video camera.

Figure 3:
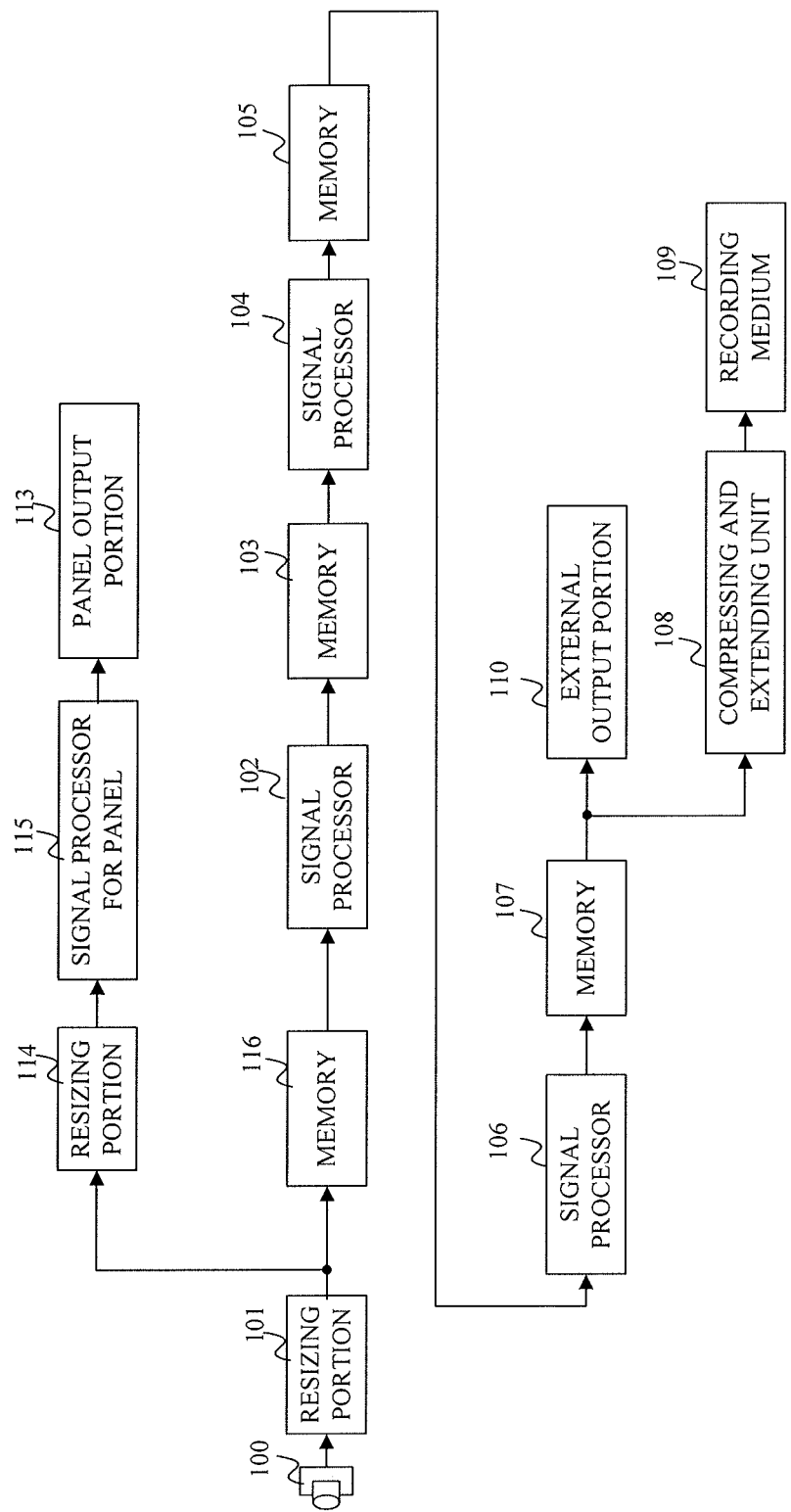
FIG. 3 is a function configuration block diagram illustrating an example of the connection of a main datapath of Embodiment 2.

First, a description will be given of the function configuration of this embodiment with reference to the function configuration block diagram of FIG. 3. A description will be given only of a portion which is different from the configuration of Embodiment 1, and will be omitted for the same portion as the configuration of Embodiment 1 to which the same reference numerals as those of Embodiment 1 are given.

A resizing portion 114 reduces the size of the RGB image output by the resizing portion 101 to the display size on the panel. When the size of the RGB image is reduced, an image band is controlled by a band limiting filter in both horizontal and vertical directions relative to the RGB image to prevent aliasing of the RGB image. Thereafter, the size of the RGB image is reduced by interpolation method such as bi-cubic interpolation.

A signal processor for panel 115 receives the RGB image which is output by the resizing portion 114 and is reduced to the display size on the panel, and then performs several processing for the reduced RGB image, such as color adjustment processing and resolution adjustment processing, in conformity with the specifications of the panel. After that, the signal processor for panel 115 outputs the processed RGB image signal.

A memory 116 is necessary when the signal processor 102 for recorded image performs noise reduction processing. It stores the RGB image output by the resizing portion 101.

Figure 21B:
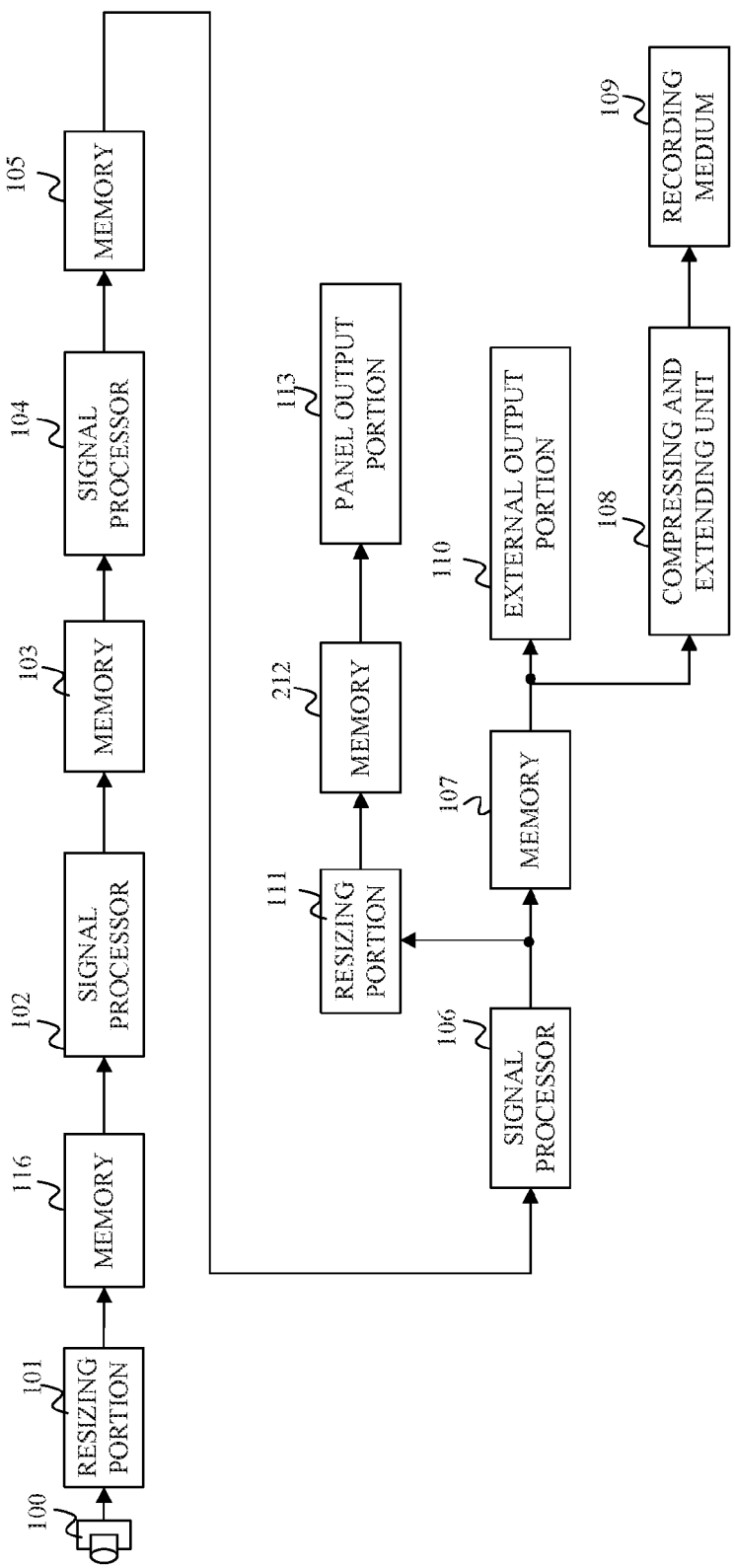

Conventionally, as illustrated in the function configuration block diagram of FIG. 21B, the resizing portion 111 received, from the signal processor 106, an YCC image signal for which all processing intended for recorded image is performed except for compressing and extension processing, and then the YCC image signal was stored in the memory 212. After that, the panel output portion 113 transmitted the image signal read from the memory 212 to the panel to cause an image to be displayed.

Figure 4:
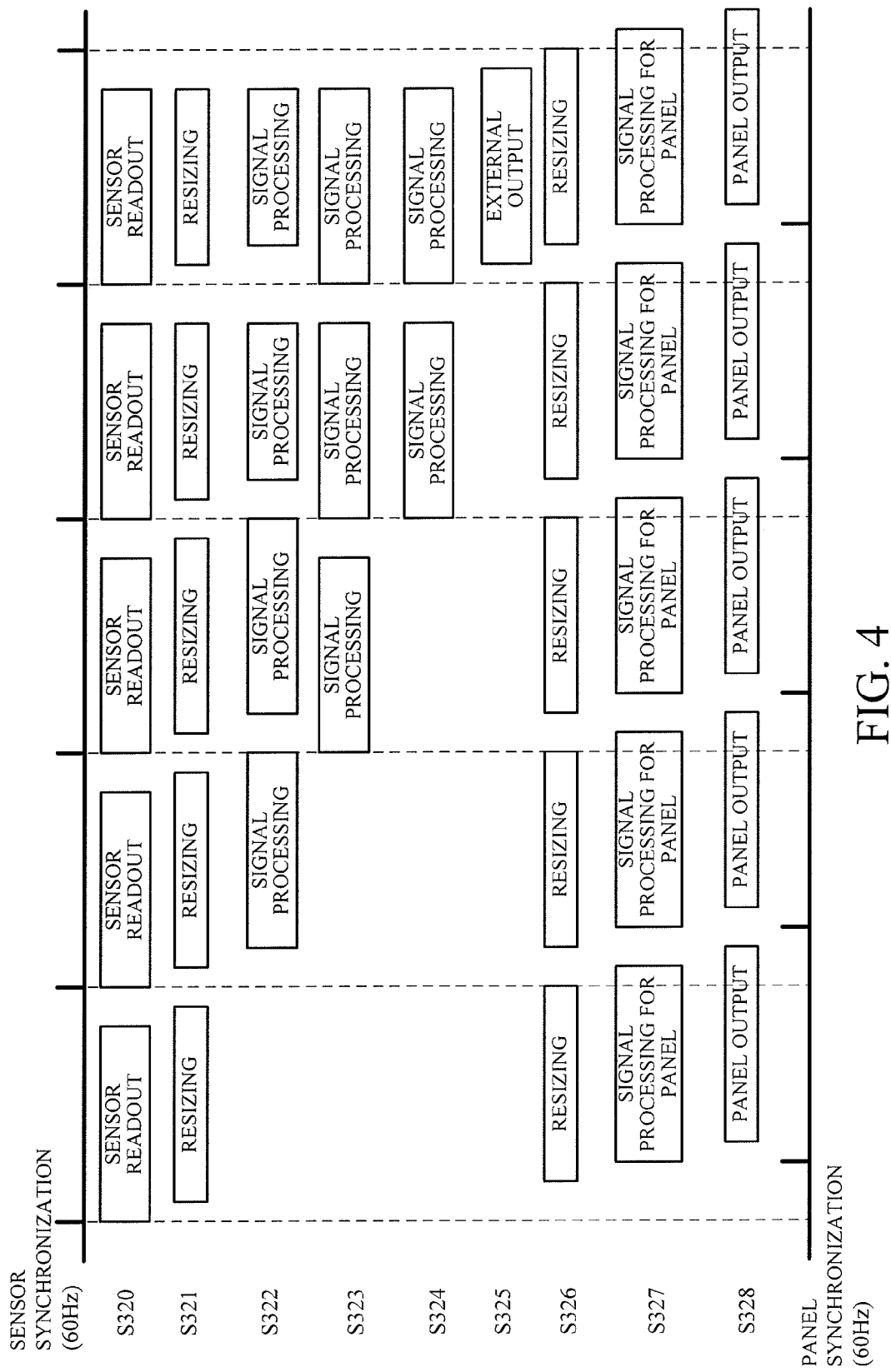
FIG. 4 is a diagram illustrating an example of the operation timing chart of Embodiment 2.

Next, a description will be given of operation timing, referring to FIG. 4 which illustrates the operation timing chart of this embodiment.

In this embodiment, the driving cycle of the sensor 100 and that of the panel synchronize at 60 Hz. As illustrated in FIG. 2, this synchronization occurs such that the synchronization timing of the panel is later compared with that of the sensor 100. The number of pixels of the sensor 100 is 4096 (H)×2160 (V)=8847360 pixels, and that of the panel is 960 pixels (H)×540 lines (V)=518400 pixels.

At step S320, the sensor 100 outputs an RGB image signal (4096 pixels (H)×2160 lines (V)).

At step S321, the resizing portion 101 reduces the size of the RGB image signal output by the sensor 100 to a size processable by the signal processor 102 (2048 pixels (H)× 1080 lines (V)). After that, it writes the reduced RGB image signal in the memory 116 and transmits the image signal to the resizing portion 114.

At step S322, the signal processor 102 converts the reduced RGB image signal into a luminance signal (Y) and color difference signals (Cb, Cr). Noise reduction processing may be performed before the Y-C conversion. The converted YCC image signal is written in the memory 103.

At step S323, the signal processor 104 reads the YCC image signal written in the memory 103 at step S322, one frame time later from the processing performed at step S322. The YCC image signal is written in the memory 105 after several processing such as the correction processing for the distortion of the lens and the vibration proof processing for the image pickup apparatus are performed.

At step S324, the signal processor 106 reads the YCC image signal written in the memory 105 at step S323, one frame time later from the processing performed at step S323. The YCC image signal is written in the memory 107 after the noise reduction processing is performed.

At step S325, the external output portion 110 reads the YCC image signal written in the memory 107 at step S324, one frame time later from the processing performed at step S324. After that, the external output portion 110 converts the format of the YCC image signal in conformity with HDMI, SDI, and a transmission format for image signal such as component video signal and composite video signal, and then outputs the converted YCC image signal to the outside of the image pickup apparatus.

In the case of the conventional configuration, the resizing portion 111 received an image from the signal processor 106, performed image reduction processing for the image, and then causes the image to be stored in the memory 212.

Figure 22B:
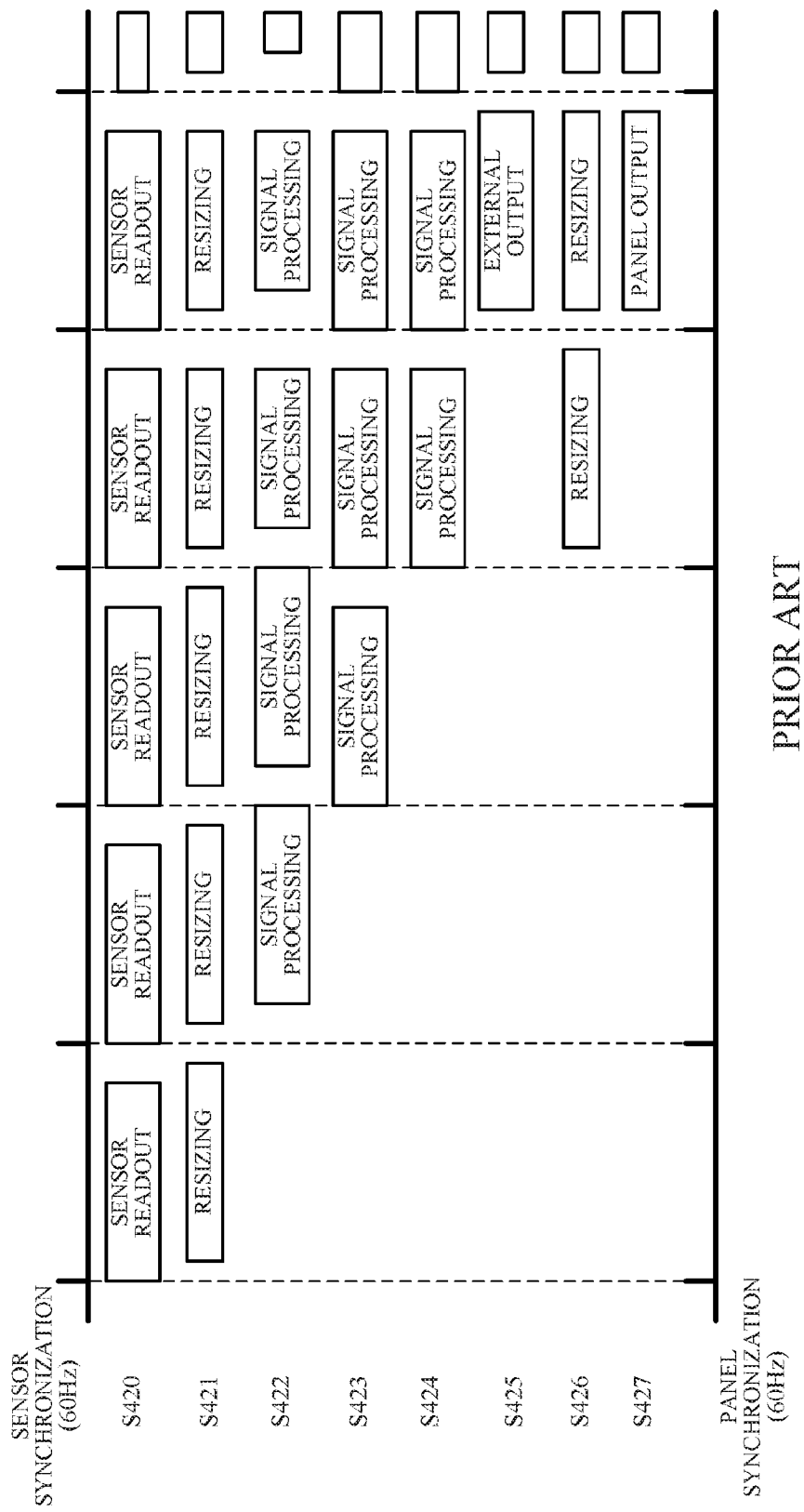

Thus, as illustrated in FIG. 22B, at step S426, the resizing portion 111 reduces the size of the YCC image signal transmitted from the signal processor 106 to the display size on the panel (960 pixels (H)×540 lines (V)).

After that, at step S427, the panel output portion 113 transmitted the image signal read from the memory 212 to the panel to cause an image to be displayed.

This means that there occurs, on the panel, a display delay of four frame times counting from step S420 due to the combination of the time required for step S425 and that required for the processing of output on the panel at step S427. If the frame rate is 60 Hz, a delay of about 67[ms] occurs.

For clarity, steps S420 to S425 correspond to steps S320 to S325.

In this embodiment, at step S326 following step S321, the resizing portion 114 reduces the size of the RCC image signal transmitted from the resizing portion 101 to the display size on the panel (960 pixels (H)×540 lines (V)).

At step S327, the signal processor for panel 115 performs several processing such as color adjustment processing and resolution adjustment processing in conformity with the specifications of the panel.

At step S328, the panel output portion 113 transmits the image signal whose format is converted in conformity with the receiving format of the panel to the panel to cause the image to be displayed.

In the case of the configuration according to this embodiment, the process starting from the output of an RGB image signal from the sensor 100 ending with the display of an image on the panel is completed within one frame time. This makes it possible to reduce a display delay which occurs when an image being shot is displayed on the display device to one frame time or less.

Each memory includes a memory such as a DRAM. The configuration of each memory may be either one of the following: the configuration in which one memory is used with address control or the configuration in which a plurality of memories are used.

For clarity, although not illustrated in the figure, a controller for controlling the synchronization of the driving cycle of the sensor 100 and that of the panel is necessary. It is desirable for the controller to have a configuration in which each of the sensor 100 and the panel can control its driving cycle and delay time. More specifically, such a configuration should ensure that the driving delay amount of the synchronization signal of the driving cycle of the panel falls within a predetermined range on the basis of the driving cycle of the sensor 100 derived from the measurement of the delay amounts of the sensor 100 and the panel. The driving cycle of the sensor 100 and that of the panel are easy to control if they are the same length of cycle, but are not limited to such same length of cycle.

Although not illustrated in the figure, a control block for controlling each block, such as a CPU, is necessary. Such a control block needs to perform, in particular, signal processing and setting adjustment for signal processing for panel.

[Embodiment 3]

This embodiment will describe a configuration in which a display delay is reduced by connecting an YCC signal extracted from a portion of the signal processing circuit for recorded image to the processing circuit for displayed image, with an example being a video camera. In this embodiment, the frame rate during driving of the sensor 100 is different from the frame rate during output on the panel.

Figure 5:
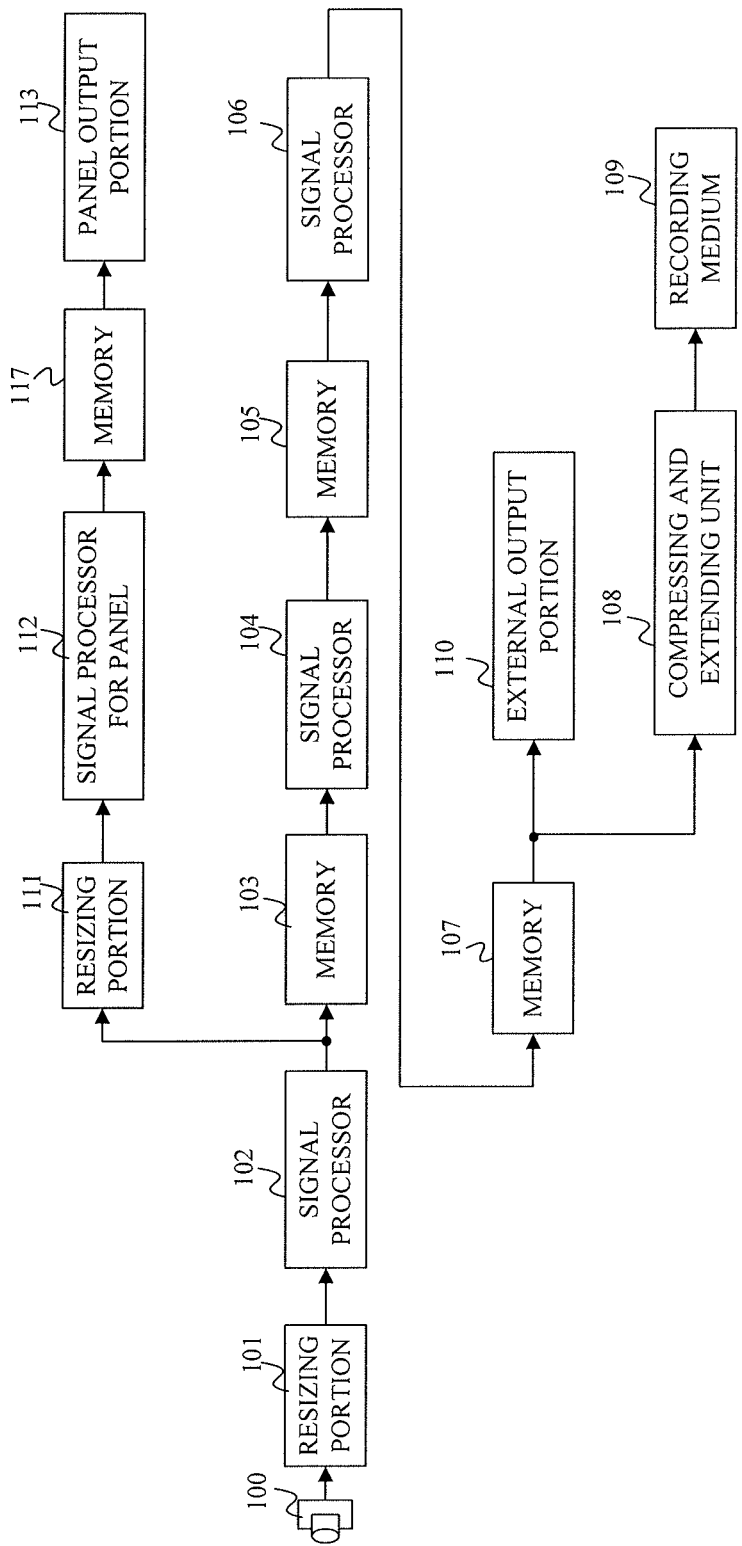
FIG. 5 is a function configuration block diagram illustrating an example of the connection of a main datapath of Embodiment 3.

First, a description will be given of the function configuration of this embodiment with reference to the function configuration block diagram of FIG. 5. A description will be given only of a portion which is different from the configurations of Embodiments 1 and 2, and will be omitted for the same portion as the configurations of Embodiments 1 and 2 to which the same reference numerals as those of Embodiments 1 and 2 are given.

A memory 117 is a block necessary for conversion of a frame rate. The memory 117 operates at the same frame rate as that of the driving cycle of the sensor 100 until the color adjustment processing and the resolution adjustment processing are performed by the signal processor for panel 112, and then stores an image.

Figure 6:
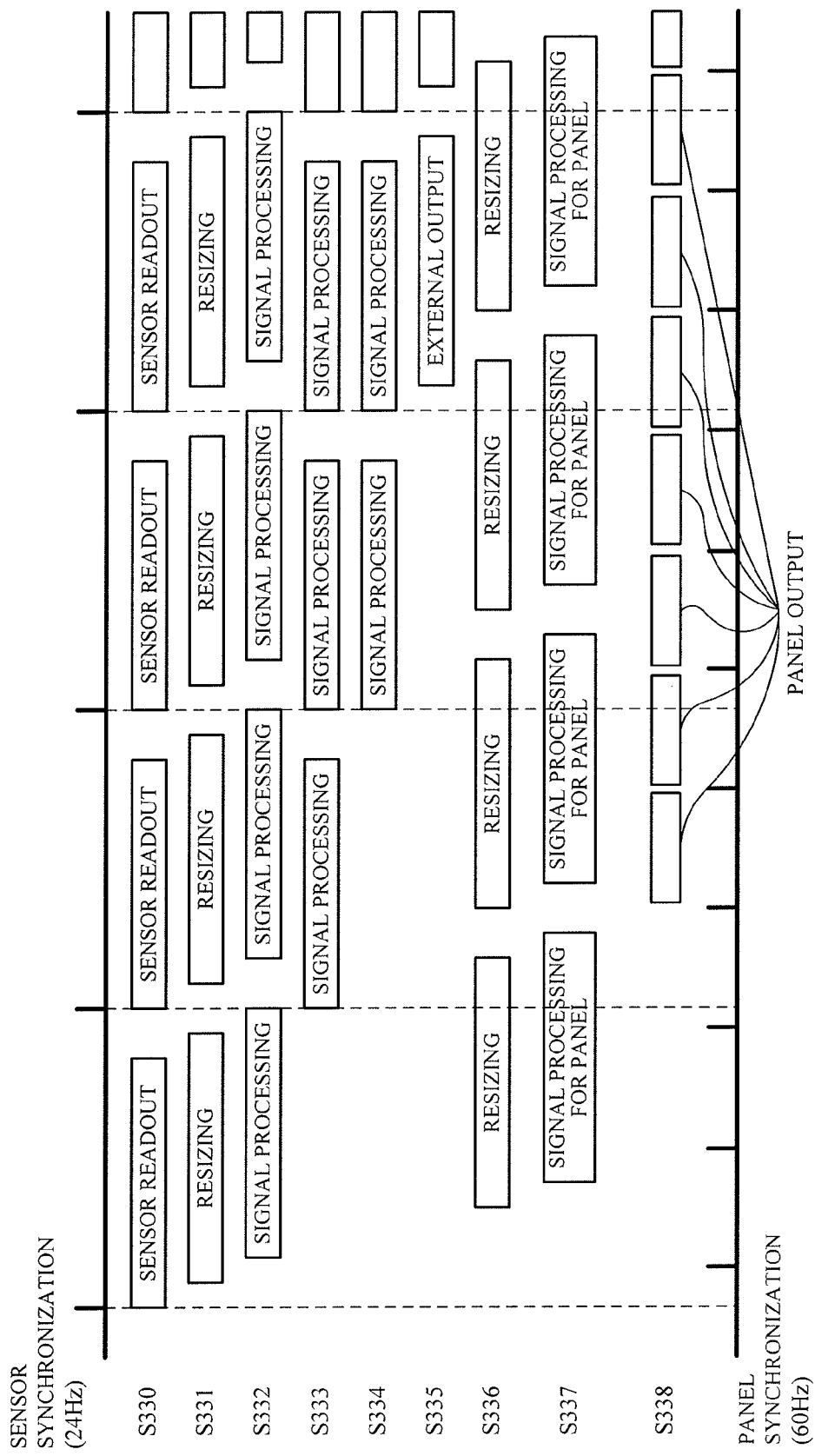
FIG. 6 is a diagram illustrating an example of the operation timing chart of Embodiment 3.

Next, a description will be given of operation timing, referring to FIG. 6 which illustrates the operation timing chart of this embodiment.

In this embodiment, the driving cycle of the sensor 100 and that of the panel are different, but synchronize. The driving cycle of the sensor 100 is 24 Hz and that of the panel is 60 Hz. As illustrated in FIG. 6, this synchronization occurs such that the synchronization timing of the panel whose driving cycle is shorter is later compared with that of the sensor 100. The number of pixels of the sensor 100 is 4096 (H)×2160 (V)=8847360 pixels, and that of the panel is 960 pixels (H)×540 lines (V)=518400 pixels.

At step S330, the sensor 100 outputs an RGB image signal (4096 pixels (H)×2160 lines (V)).

At step S331, the resizing portion 101 reduces the size of the RGB image signal output by the sensor 100 to a size processable by the signal processor 102 (2048 pixels (H)×1080 lines (V)).

At step S332, the signal processor 102 converts the reduced RGB image signal into a luminance signal (Y) and color difference signals (Cb, Cr). Noise reduction processing may be performed before the Y-C conversion. The converted YCC image signal is written in the memory 103 and transmitted to the resizing portion 111.

At step S333, the signal processor 104 reads the YCC image signal written in the memory 103 at step S332, one frame time later from the processing performed at step S332. The YCC image signal is written in the memory 105 after several processing such as the correction processing for the distortion of the lens and the vibration proof processing for the image pickup apparatus are performed.

At step S334, the signal processor 106 reads the YCC image signal written in the memory 105 at step S333, one frame time later from the processing performed at step S333. The YCC image signal is written in the memory 107 after the noise reduction processing is performed.

At step S335, the external output portion 110 reads the YCC image signal written in the memory 107 at step S334, one frame time later from the processing performed at step S324. After that, the external output portion 110 converts the format of the YCC image signal in conformity with HDMI, SDI, and a transmission format for image signal such as component video signal and composite video signal, and then outputs the converted YCC image signal to the outside of the image pickup apparatus.

In the case of the conventional configuration, as illustrated in FIG. 21A, the resizing portion 111 received an image from the signal processor 106, performed image reduction processing for the image, and then causes the image to be stored in the memory 212.

Figure 22C:
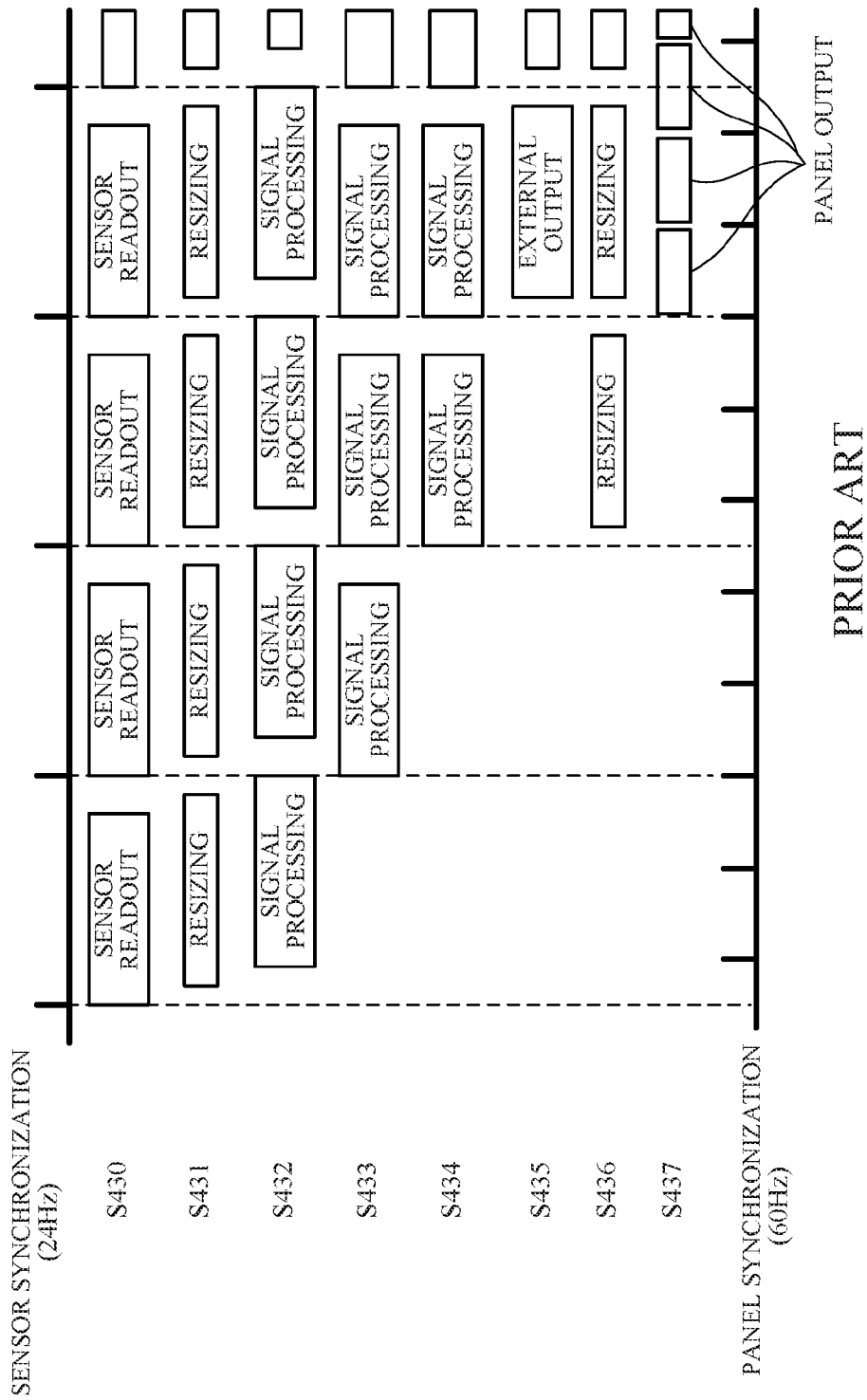

Thus, as illustrated in FIG. 22C, at step S436, the resizing portion 111 reduces the size of the YCC image signal transmitted from the signal processor 106 to the display size on the panel (960 pixels (H)×540 lines (V)).

After that, at step S437, the panel output portion 113 transmitted the image signal read from the memory 212 to the panel to cause the image to be displayed.

This means that there occurs, on the panel, a display delay of three frame times counting from step S430 due to the combination of the time required for step S435 and that required for the processing of output on the panel at step S437. If the frame rate is 60 Hz, a delay of about 50[ms] occurs.

For clarity, steps S430 to S435 correspond to steps S330 to S355.

In this embodiment, at step S336 following step S332, the resizing portion 111 reduces the size of the YCC image signal transmitted from the signal processor 102 to the display size on the panel (960 pixels (H)×540 lines (V)).

At step S337, the signal processor for panel 112 performs several processing such as color adjustment processing and resolution adjustment processing in conformity with the specifications of the panel. The image is then stored in the memory 117.

At step S338, the panel output portion 113 reads the image from the memory 117 in synchronization with the driving cycle of the panel, and then transmits the image signal whose format is converted in conformity with the receiving format of the panel to the panel to cause the image to be displayed. For each one reading frame of the sensor 100, the panel output portion 113 reads the same image from the memory 117 for two or three frames.

In the case of the configuration according to this embodiment, the process starting from the output of an RGB image signal from the sensor 100 ending with the display of an image on the panel is completed within two frame times. This makes it possible to reduce a display delay which occurs when an image being shot is displayed on the display device to two frame times or less.

Each memory includes a memory such as a DRAM. The configuration of each memory may be either one of the following: the configuration in which one memory is used with address control or the configuration in which a plurality of memories are used.

For clarity, although not illustrated in the figure, a controller for controlling the synchronization of the driving cycle of the sensor 100 and that of the panel is necessary. It is desirable for the controller to have a configuration in which each of the sensor 100 and the panel can control its driving cycle and delay time. More specifically, such a configuration should ensure that the driving delay amount of the synchronization signal of the driving cycle of the panel falls within a predetermined range on the basis of the driving cycle of the sensor 100 derived from the measurement of the delay amounts of the sensor 100 and the panel.

Although not illustrated in the figure, a control block for controlling each block, such as a CPU, is necessary. Such a control block needs to perform, in particular, signal processing and setting adjustment for signal processing for panel.

In addition, since output on the panel requires two or three frames for each one reading frame of the sensor 100, the management needs to be performed for the frames of the image output by the signal processor for panel 112 and the image received by the panel output portion 113.

[Embodiment 4]

This embodiment will describe a configuration in which a display delay is reduced by connecting an YCC signal extracted from a portion of the signal processing circuit for recorded image to the processing circuit for displayed image, with an example being a video camera.

Figure 7:
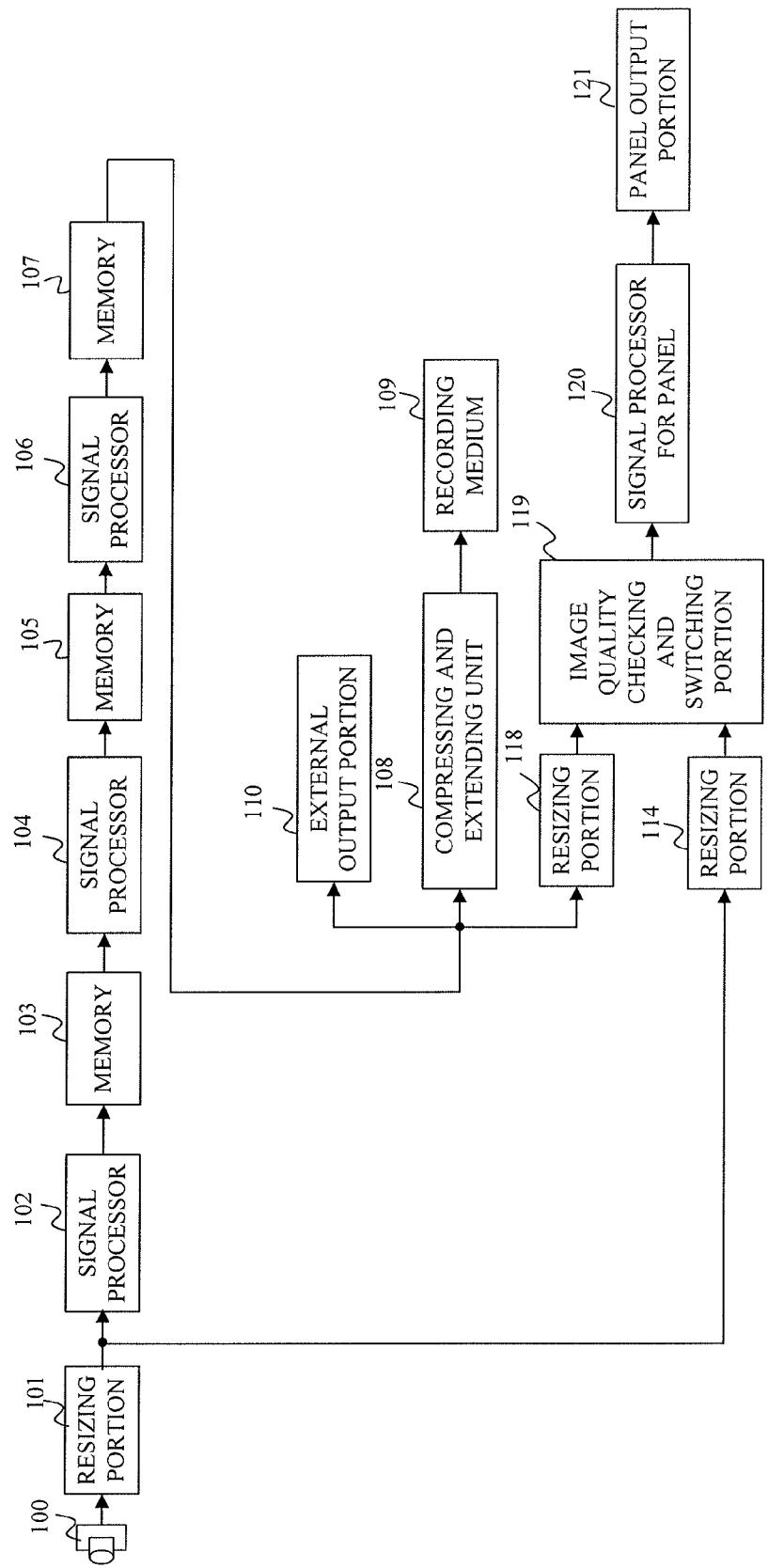
FIG. 7 is a function configuration block diagram illustrating an example of the connection of a main datapath of Embodiment 4.

First, a description will be given of the function configuration of this embodiment with reference to the function configuration block diagram of FIG. 7. A description will be given only of a portion which is different from the configurations of Embodiments 1 to 3, and will be omitted for the same portion as the configurations of Embodiments 1 to 3 to which the same reference numerals as those of Embodiments 1 to 3 are given.

A resizing portion (third image reduction portion) 118 reads an YCC image signal from the memory 107, reduces the size of the YCC image signal to the display size on the panel, and then converts the reduced YCC image signal to an RGB image signal. When the size of the YCC image is reduced, an image band is controlled by a band limiting filter in both horizontal and vertical directions relative to the YCC image to prevent aliasing of the YCC image. Thereafter, the size of the YCC image is reduced by interpolation method such as bi-cubic interpolation.

An image quality checking and switching portion 119 generally selects the output of the resizing portion 114 whose display delay is reduced, to output an image. When the image quality checking and switching portion 119 checks the quality of the image, it selects the output of the resizing portion 118 which reduces the size of the image for which the same signal processing as that for a recorded image is performed. An image to be displayed is set by the user manually or by the video camera automatically according to shooting conditions. An image for which the same signal processing as that for the recorded image is displayed during automatic setting in the case where camera operations such as zooming, panning, or mode setting are not performed for a certain period of time or where the number of such camera operations is few. Such cases include those where the number of motions of a shooting object is few, and where a white balance adjustment mode or a manual focus adjustment mode is selected.

A signal processor for panel 120 receives the RGB image output by the image quality checking and switching portion 119 whose size is reduced to the display size on the panel, and then performs several processing for the reduced RGB image, such as color adjustment processing and resolution adjustment processing, in conformity with the specifications of the panel.

A panel output portion 121 transmits an image signal converted the format in conformity with a receive format of the panel to the panel so as to display an image. To notify the user of either of the image for which the same signal processing as that for the recorded image or the image for which signal processing for display aiming to reduce a display delay is being selected, the selection results are clearly indicated on the panel with letters or images.

Figure 15A:
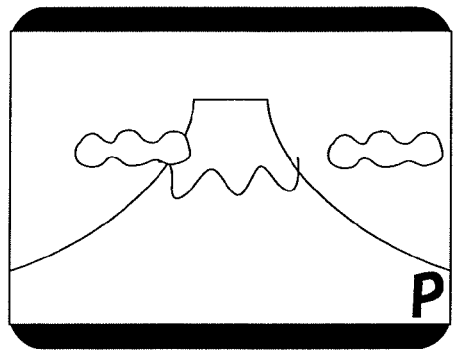
FIGS. 15A to 15D are diagrams illustrating a panel on which either of an image intended for display or an image intended for recording is displayed.
Figure 15B:
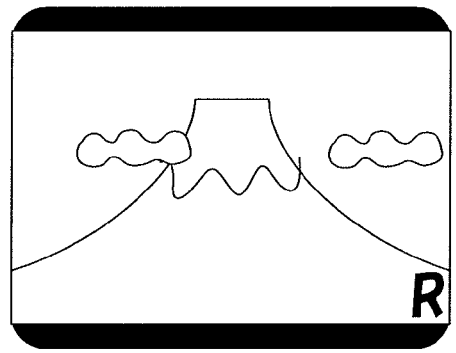

If the image for which signal processing for display aiming to reduce a display delay is performed is to be displayed, the initial P of "Panel" is displayed at the lower right of the screen as illustrated in FIG. 15A. If the image for which the same signal processing as that for the recorded image is performed is to be displayed, the initial R of "Record" is displayed at the lower right of the screen as illustrated in FIG. 15B.

Figure 8:
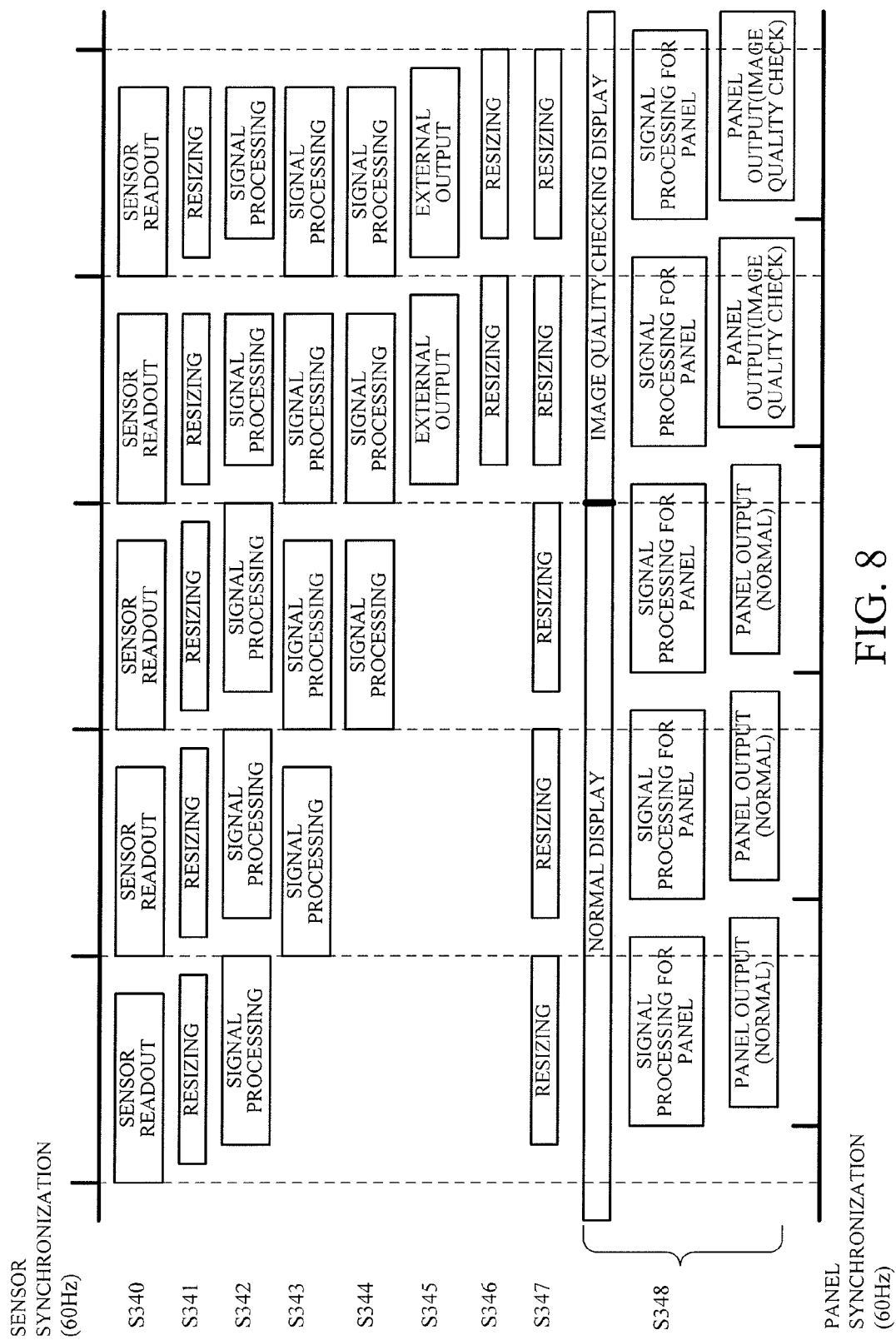
FIG. 8 is a diagram illustrating an example of the operation timing chart of Embodiment 4.

Next, a description will be given of operation timing, referring to FIG. 8 which illustrates the operation timing chart of this embodiment.

In this embodiment, the driving cycle of the sensor 100 and that of the panel synchronize at 60 Hz. As illustrated in FIG. 8, this synchronization occurs such that the synchronization timing of the panel is later compared with that of the sensor 100. The number of pixels of the sensor 100 is 4096 (H)×2160 (V)=8847360 pixels, and that of the panel is 960 pixels (H)×540 lines (V)=518400 pixels.

At step S340, the sensor 100 outputs an RGB image signal (4096 pixels (H)×2160 lines (V)).

At step S341, the resizing portion 101 reduces the size of the RGB image signal output by the sensor 100 to a size processable by the signal processor 102 (2048 pixels (H)× 1080 lines (V)), and then transmits the reduced RGB image signal to the signal processor 102 and the resizing portion 114.

At step S342, the signal processor 102 converts the reduced RGB image signal into a luminance signal (Y) and color difference signals (Cb, Cr). Noise reduction processing may be performed before the Y-C conversion. The converted YCC image signal is written in the memory 103.

At step S343, the signal processor 104 reads the YCC image signal written in the memory 103 at step S342, one frame time later from the processing performed at step S342. The YCC image signal is written in the memory 105 after several processing such as the correction processing for the distortion of the lens and the vibration proof processing for the image pickup apparatus are performed.

At step S344, the signal processor 106 reads the YCC image signal written in the memory 105 at step S343, one frame time later from the processing performed at step S343. The YCC image signal is written in the memory 107 after the noise reduction processing is performed.

At step S345, the external output portion 110 reads the YCC image signal written in the memory 107 at step S334, one frame time later from the processing performed at step S344. After that, the external output portion 110 converts the format of the YCC image signal in conformity with HDMI, SDI, and a transmission format for image signal such as component video signal and composite video signal, and then outputs the converted YCC image signal to the outside of the image pickup apparatus.

At step S346, the resizing portion 118 reads an YCC image signal from the memory 107, reduces the size of the YCC image signal to the display size on the panel, and then converts the reduced YCC image signal to an RGB image signal.

In the case of the conventional configuration, as illustrated in FIG. 21A, the resizing portion 111 received an image from the signal processor 106, performed image reduction processing for the image, and then causes the image to be stored in the memory 212.

Thus, as illustrated in FIG. 22A, at step S416, the resizing portion 111 reduces the size of the YCC image signal transmitted from the signal processor 106 to the display size on the panel (960 pixels (H)×540 lines (V)).

After that, at step S417, the panel output portion 113 transmitted the image signal read from the memory 212 to the panel to cause the image to be displayed.

This means that there occurs, on the panel, a display delay of three frame times counting from step S410 due to the combination of the time required for step S415 and that required for the processing of output on the panel at step S417. If the frame rate is 60 Hz, a delay of about 50[ms] occurs.

For clarity, steps S410 to S415 correspond to steps S340 to S345.

In this embodiment, at step S347 following step S341, the resizing portion 114 reduces the size of the RCC image signal transmitted from the resizing portion 101 to the display size on the panel (960 pixels (H)×540 lines (V)).

At step S348, a panel output portion 121 transmits the image signal whose format is converted in conformity with the receiving format of the panel to the panel to cause the image to be displayed. Either one of the image for which the same signal processing as that for the recorded image or the image for which signal processing for display aiming to reduce a display delay is selected by the image quality checking and switching portion 119 as an image to be displayed on the panel. The signal processor for panel 120 performs several processing for the selected image, such as color adjustment processing and resolution adjustment processing, in conformity with the specifications of the panel.

In the case of the configuration according to this embodiment, the process from step S340 to step S348 is completed within one frame time. This makes it possible to reduce a display delay which occurs when an image being shot is displayed on the display device to one frame time or less. If the image for which the same signal processing as that for the recorded image is to be displayed, it is possible to check the recorded image which is displayed within four frame times.

Each memory includes a memory such as a DRAM. The configuration of each memory may be either one of the following: the configuration in which one memory is used with address control or the configuration in which a plurality of memories are used.

For clarity, although not illustrated in the figure, a controller for controlling the synchronization of the driving cycle of the sensor 100 and that of the panel is necessary. It is desirable for the controller to have a configuration in which each of the sensor 100 and the panel can control its driving cycle and delay time. More specifically, such a configuration should ensure that the driving delay amount of the synchronization signal of the driving cycle of the panel falls within a predetermined range on the basis of the driving cycle of the sensor 100 derived from the measurement of the delay amounts of the sensor 100 and the panel. The driving cycle of the sensor 100 and that of the panel are easy to control if they are the same length of cycle, but are not limited to such same length of cycle.

Although not illustrated in the figure, a control block for controlling each block, such as a CPU, is necessary. Such a control block needs to perform, in particular, signal processing and setting adjustment for signal processing for panel.

[Embodiment 5]

This embodiment will describe a configuration in which a display delay is reduced by connecting an RGB signal extracted from a portion of the signal processing circuit for recorded image to the processing circuit for displayed image, with an example being a video camera.

Figure 9:
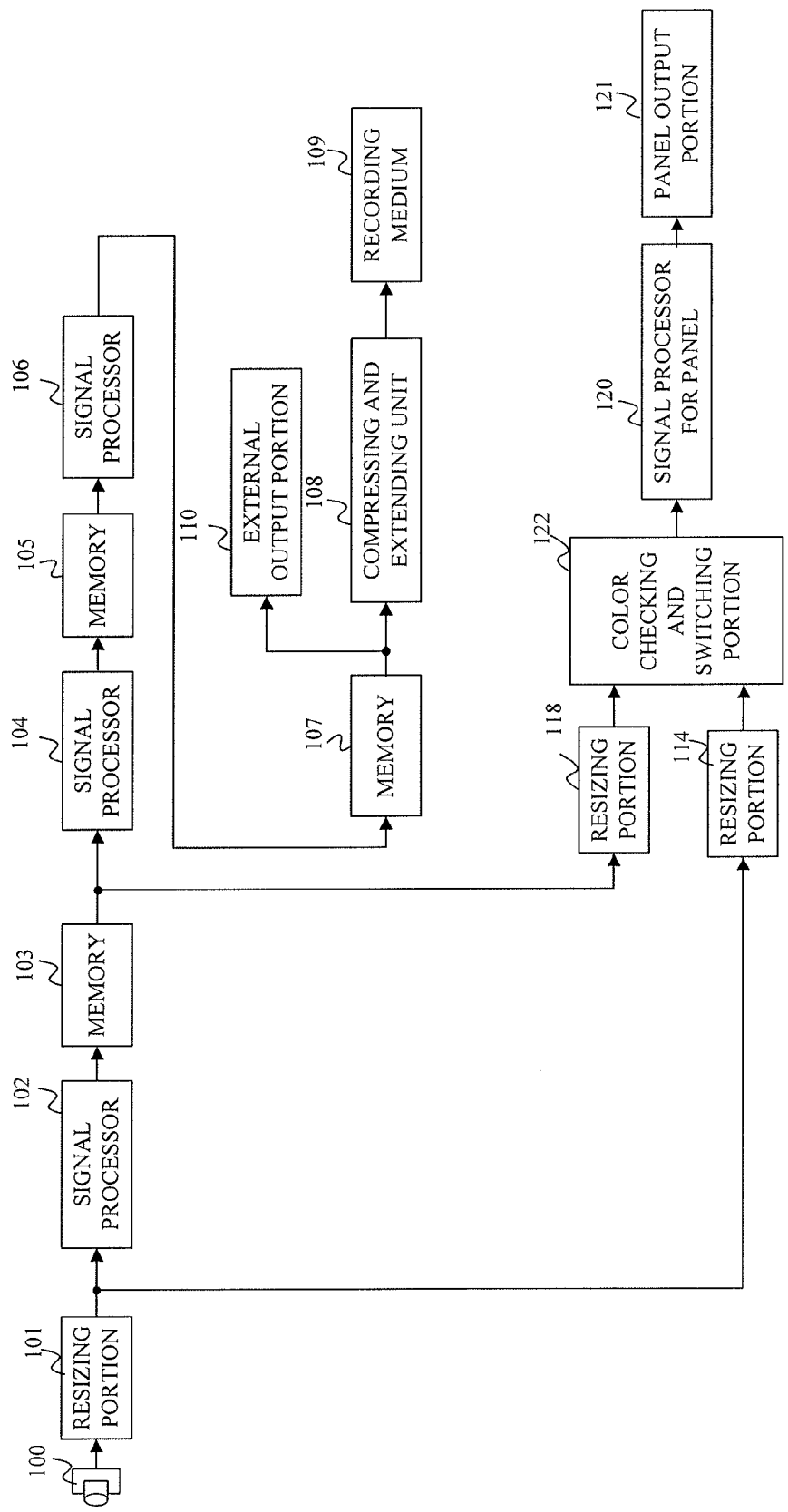
FIG. 9 is a function configuration block diagram illustrating an example of the connection of a main datapath of Embodiment 5.

First, a description will be given of the function configuration of this embodiment with reference to the function configuration block diagram of FIG. 9. A description will be given only of a portion which is different from the configurations of Embodiments 1 to 4, and will be omitted for the same portion as the configurations of Embodiments 1 to 4 to which the same reference numerals as those of Embodiments 1 to 4 are given.

Figure 15C:
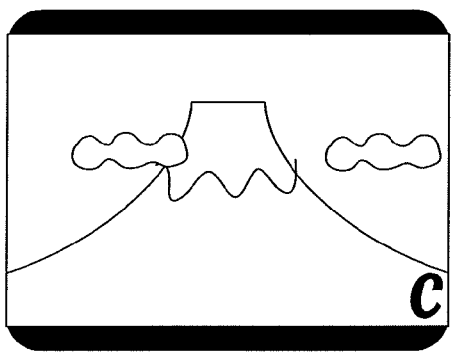

A color checking and switching portion 122 generally selects the output of the resizing portion 114 whose display delay is reduced, to output an image. When the color checking and switching portion 122 checks the color of a recorded image, it selects the output of the resizing portion 118 which reduces the size of the image for which the same color processing as that for the recorded image is performed. An image to be displayed is set by the user manually or by the video camera automatically according to shooting conditions. An image for which the same color signal processing as that for the recorded image is displayed during automatic setting in the case where camera operations such as zooming, panning, or mode setting are not performed for a certain period of time or where the number of such camera operations is few. Such cases include those where the number of motions of a shooting object is few, and where the white balance adjustment mode or the manual focus adjustment mode is selected. If the image for which signal processing for display aiming to reduce a display delay is performed is to be displayed, the initial P of "Panel" is displayed at the lower right of the screen as illustrated in FIG. 15A. If the image for which the same color signal processing as that for the recorded image is performed is to be displayed, the initial C of "Color" is displayed at the lower right of the screen as illustrated in FIG. 15C.

Different from Embodiment 4, the resizing portion 118 reads an YCC image signal from the memory 103, reduces the size of the YCC image signal to the display size on the panel, and then converts the reduced YCC image signal into an RGB image signal. When the size of the YCC image is reduced, an image band is controlled by a band limiting filter in both horizontal and vertical directions relative to the YCC image to prevent aliasing of the YCC image.

Figure 10:
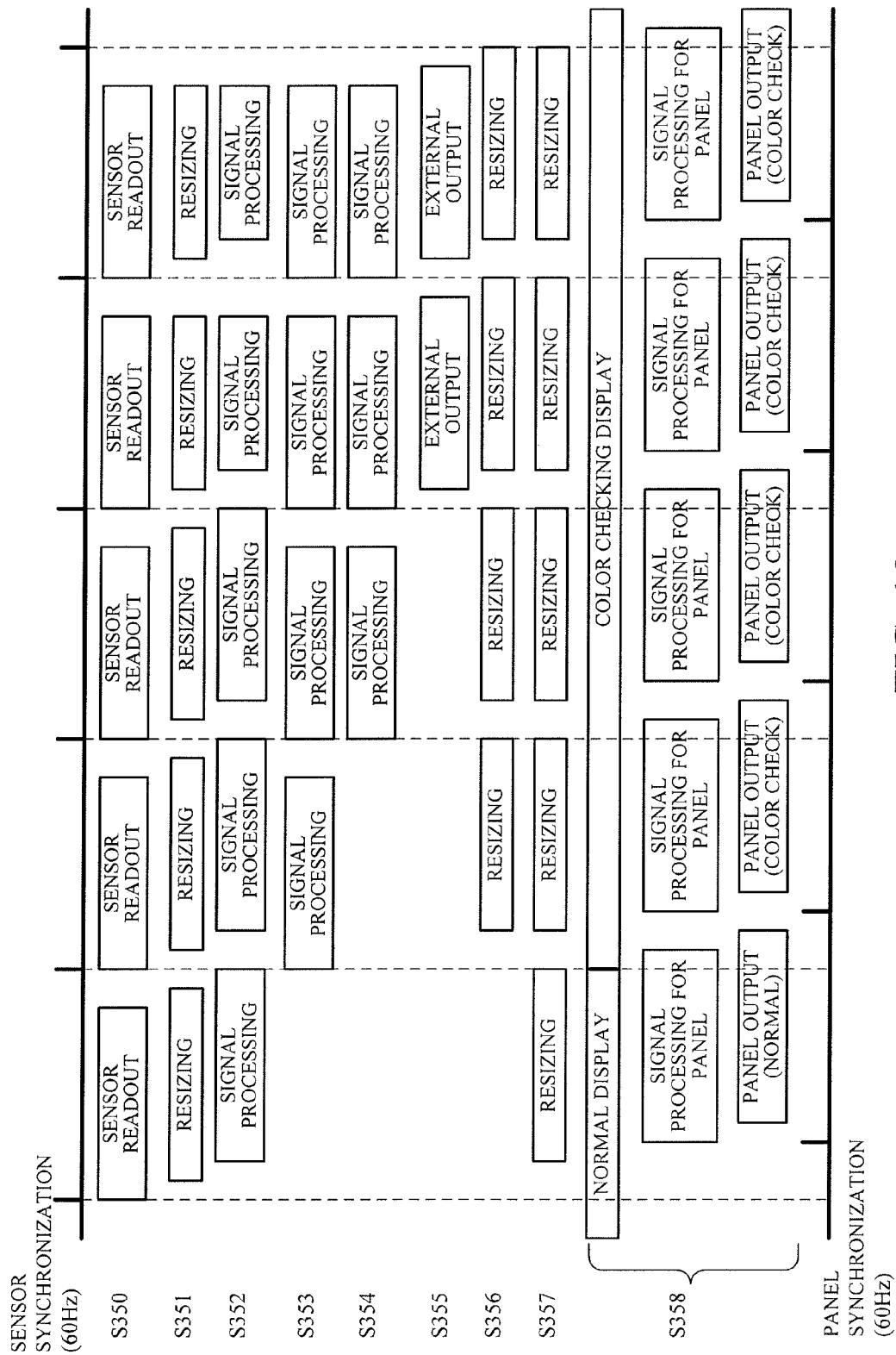
FIG. 10 is a diagram illustrating an example of the operation timing chart of Embodiment 5.

Next, a description will be given of operation timing, referring to FIG. 10 which illustrates the operation timing chart of this embodiment.

In this embodiment, the driving cycle of the sensor 100 and that of the panel synchronize at 60 Hz. As illustrated in FIG. 8, this synchronization occurs such that the synchronization timing of the panel is later compared with that of the sensor 100. The number of pixels of the sensor 100 is 4096 (H)×2160 (V)=8847360 pixels, and that of the panel is 960 pixels (H)×540 lines (V)=518400 pixels.

At step S350, the sensor 100 outputs an RGB image signal (4096 pixels (H)×2160 lines (V)).

At step S351, the resizing portion 101 reduces the size of the RGB image signal output by the sensor 100 to a size processable by the signal processor 102 (2048 pixels (H)× 1080 lines (V)), and then transmits the reduced RGB image signal to the signal processor 102 and the resizing portion 114.

At step S352, the signal processor 102 converts the reduced RGB image signal into a luminance signal (Y) and color difference signals (Cb, Cr). Noise reduction processing may be performed before the Y-C conversion. The converted YCC image signal is written in the memory 103.

At step S353, the signal processor 104 reads the YCC image signal written in the memory 103 at step S352, one frame time later from the processing performed at step S352. The YCC image signal is written in the memory 105 after several processing such as the correction processing for the distortion of the lens and the vibration proof processing for the image pickup apparatus are performed.

At step S354, the signal processor 106 reads the YCC image signal written in the memory 105 at step S353, one frame time later from the processing performed at step S353. The YCC image signal is written in the memory 107 after the noise reduction processing is performed.

At step S355, the external output portion 110 reads the YCC image signal written in the memory 107 at step S354, one frame time later from the processing performed at step S354. After that, the external output portion 110 converts the format of the YCC image signal in conformity with HDMI, SDI, and a transmission format for image signal such as component video signal and composite video signal, and then outputs the converted YCC image signal to the outside of the image pickup apparatus.

At step S356, the resizing portion 118 reads an YCC image signal from the memory 103, reduces the size of the YCC image signal to the display size on the panel, and then converts the reduced YCC image signal to an RGB image signal.

In the case of the conventional configuration, as illustrated in FIG. 21A, the resizing portion 111 received an image from the signal processor 106, performed image reduction processing for the image, and then causes the image to be stored in the memory 212.

Thus, as illustrated in FIG. 22A, at step S416, the resizing portion 111 reduces the size of the YCC image signal transmitted from the signal processor 106 to the display size on the panel (960 pixels (H)×540 lines (V)).

After that, at step S417, the panel output portion 113 transmitted the image signal read from the memory 212 to the panel to cause the image to be displayed.

This means that there occurs, on the panel, a display delay of three frame times counting from step S410 due to the combination of the time required for step S415 and that required for the processing of output on the panel at step S417. If the frame rate is 60 Hz, a delay of about 50[ms] occurs.

For clarity, steps S410 to S415 correspond to steps S350 to S355.

In this embodiment, at step S357 following step S351, the resizing portion 114 reduces the size of the RCC image signal transmitted from the resizing portion 101 to the display size on the panel (960 pixels (H)×540 lines (V)).

At step S358, the panel output portion 121 transmits the image signal whose format is converted in conformity with the receiving format of the panel to the panel to cause the image to be displayed. Either one of the image for which the same signal processing as that for the recorded image or the image for which signal processing for display aiming to reduce a display delay is selected by the color checking and switching portion 122 as an image to be displayed on the panel. The signal processor for panel 120 performs several processing for the selected image, such as color adjustment processing and resolution adjustment processing, in conformity with the specifications of the panel.

In the case of the configuration according to this embodiment, the process from step S350 to step S358 is completed within one frame time. This makes it possible to reduce a display delay which occurs when an image being shot is displayed on the display device to one frame time or less. If the image for which the same signal processing as that for the recorded image is to be displayed, it is possible to check the recorded image which is displayed within two frame times.

The configuration of each memory may be either one of the following: the configuration in which one memory is used with address control or the configuration in which a plurality of memories are used.

For clarity, although not illustrated in the figure, a controller for controlling the synchronization of the driving cycle of the sensor 100 and that of the panel is necessary. It is desirable for the controller to have a configuration in which each of the sensor 100 and the panel can control its driving cycle and delay time. More specifically, such a configuration should ensure that the driving delay amount of the synchronization signal of the driving cycle of the panel falls within a predetermined range on the basis of the driving cycle of the sensor 100 derived from the measurement of the delay amounts of the sensor 100 and the panel. The driving cycle of the sensor 100 and that of the panel are easy to control if they are the same length of cycle, but are not limited to such same length of cycle.

Although not illustrated in the figure, a control block for controlling each block, such as a CPU, is necessary. Such a control block needs to perform, in particular, signal processing and setting adjustment for signal processing for panel.

[Embodiment 6]

This embodiment will describe a configuration in which a display delay is reduced by connecting an RGB signal extracted from a portion of the signal processing circuit for recorded image to the processing circuit for displayed image, with an example being a video camera.

Figure 11:
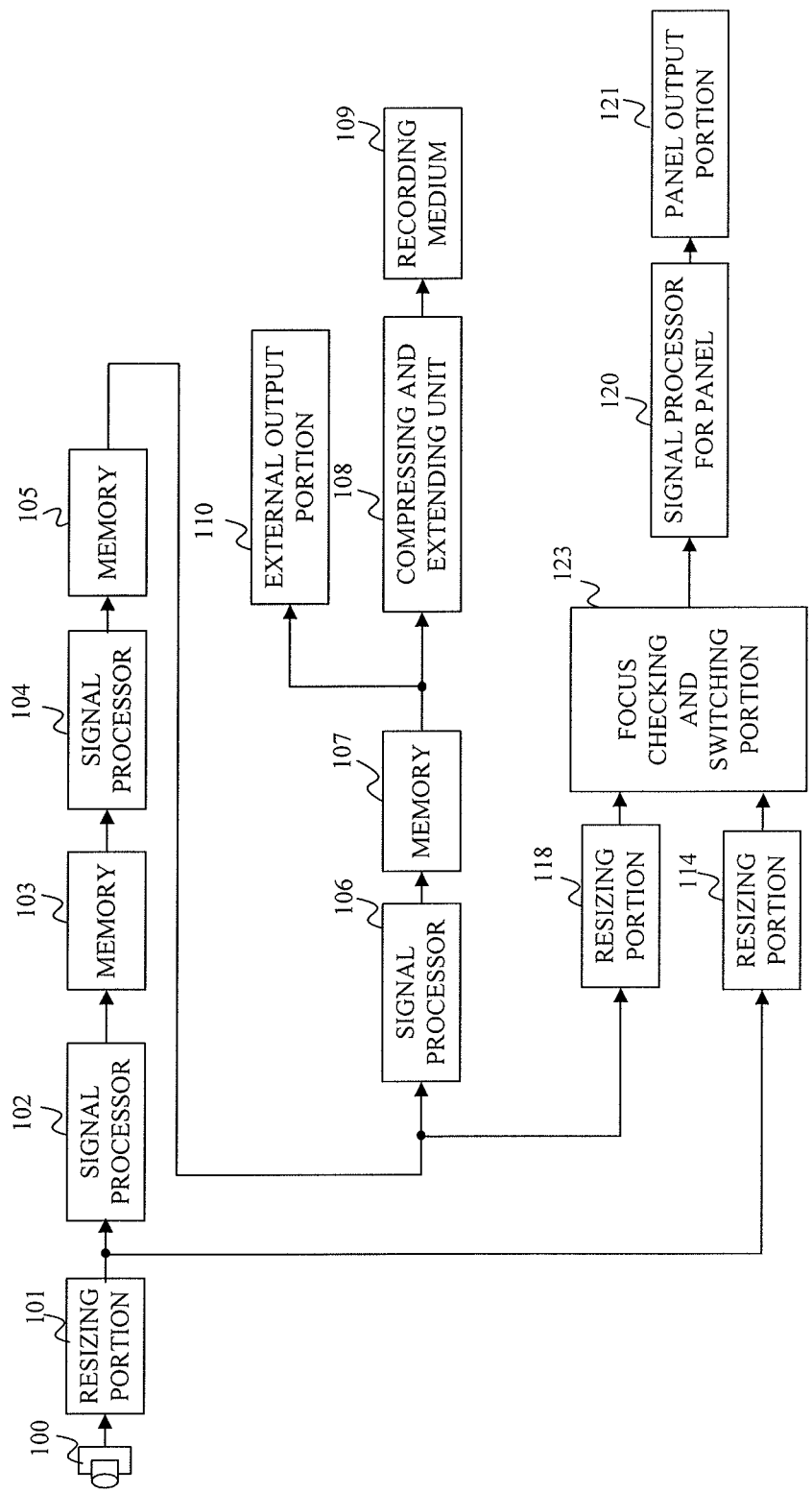
FIG. 11 is a function configuration block diagram illustrating an example of the connection of a main datapath of Embodiment 6.

First, a description will be given of operation occurring in the function configuration of this embodiment with reference to the function configuration block diagram of FIG. 11. A description will be given only of a portion which is different from the configurations of Embodiments 1 to 5, and will be omitted for the same portion as the configurations of Embodiments 1 to 5 to which the same reference numerals as those of Embodiments 1 to 5 are given.

Figure 15D:
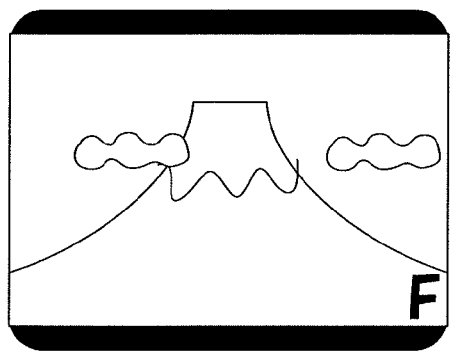

A focus checking and switching portion 123 generally selects the output of the resizing portion 114 whose display delay is reduced, to output an image. When the focus checking and switching portion 123 checks the focus of a recorded image, it selects the output of the resizing portion 118 which reduces the size of the image for which the same correction processing for the distortion of the lens and the vibration proof processing for the image pickup apparatus as those for the recorded image are performed. An image to be displayed is set by the user manually or by the video camera automatically according to shooting conditions. An image for which the same signal processing as that for the recorded image is displayed during automatic setting in the case where camera operations such as zooming, panning, or mode setting are not performed for a certain period of time or where the number of such camera operations is few. Such cases include those where the number of motions of a shooting object is few, and where a manual focus mode is selected. If the image for which signal processing for display aiming to reduce a display delay is performed is to be displayed, the initial P of "Panel" is displayed at the lower right of the screen as illustrated in FIG. 15A. If the image for checking of the focus state of the recorded image is to be displayed, the initial F of "Focus" is displayed at the lower right of the screen as illustrated in FIG. 15D.

Different from Embodiments 4 and 5, the resizing portion 118 reads an YCC image signal from the memory 105, reduces the size of the YCC image signal to the display size on the panel, and then converts the reduced YCC image signal into an RGB image signal. When the size of the YCC image is reduced, an image band is controlled by a band limiting filter in both horizontal and vertical directions relative to the YCC image to prevent aliasing of the YCC image. Thereafter, the size of the RGB image is reduced by interpolation method such as bi-cubic interpolation.

Figure 12:
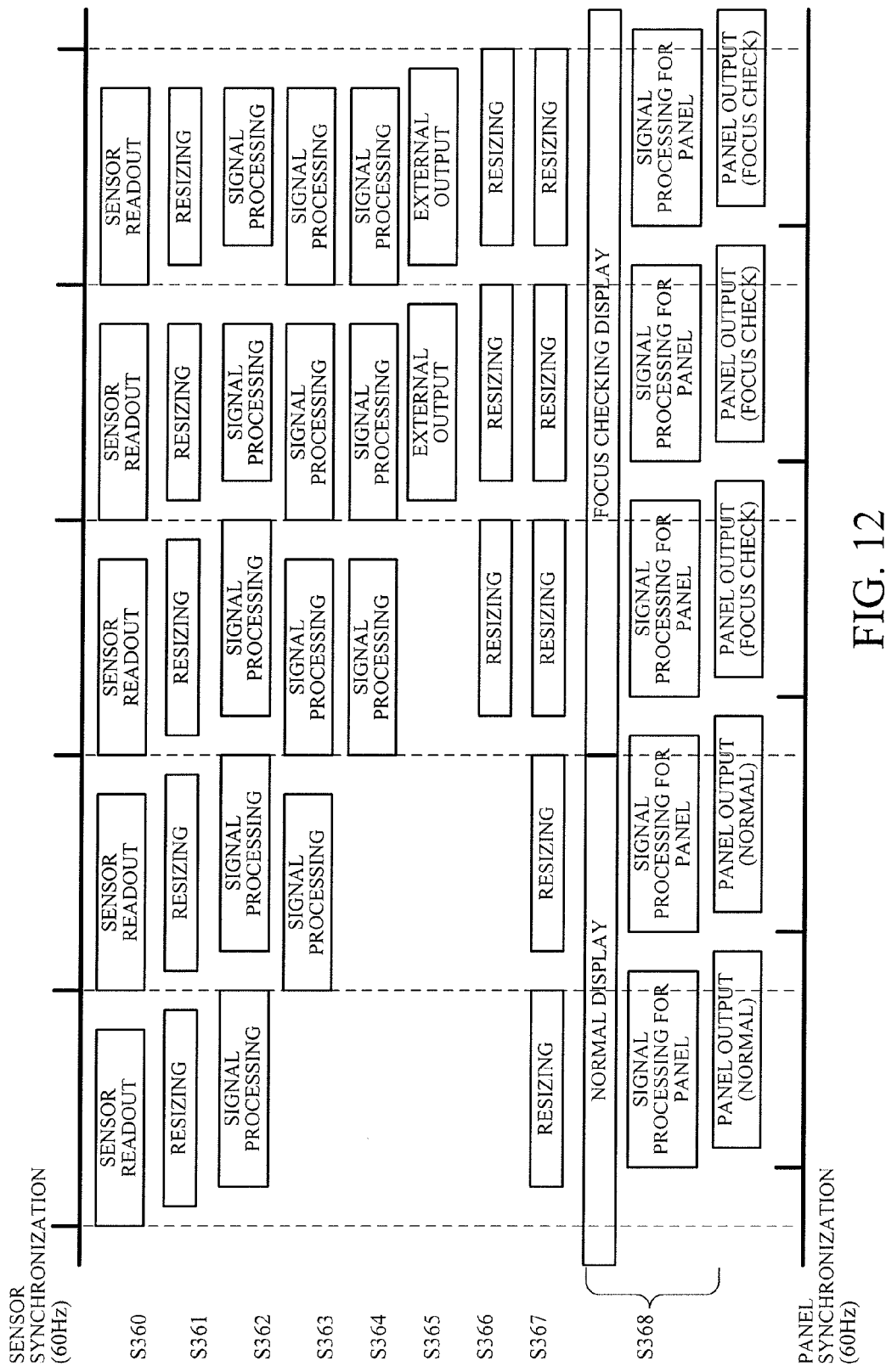
FIG. 12 is a diagram illustrating an example of the operation timing chart of Embodiment 6.

Next, a description will be given of operation timing, referring to FIG. 12 which illustrates the operation timing chart of this embodiment.

In this embodiment, the driving cycle of the sensor 100 and that of the panel synchronize at 60 Hz. As illustrated in FIG. 12, this synchronization occurs such that the synchronization timing of the panel is later compared with that of the sensor 100. The number of pixels of the sensor 100 is 4096 (H)×2160 (V)=8847360 pixels, and that of the panel is 960 pixels (H)×540 lines (V)=518400 pixels.

At step S360, the sensor 100 outputs an RGB image signal (4096 pixels (H)×2160 lines (V)).

At step S361, the resizing portion 101 reduces the size of the RGB image signal output by the sensor 100 to a size processable by the signal processor 102 (2048 pixels (H)× 1080 lines (V)), and then transmits the reduced RGB image signal to the signal processor 102 and the resizing portion 114.

At step S362, the signal processor 102 converts the reduced RGB image signal into a luminance signal (Y) and color difference signals (Cb, Cr). Noise reduction processing may be performed before the Y-C conversion. The converted YCC image signal is written in the memory 103.

At step S363, the signal processor 104 reads the YCC image signal written in the memory 103 at step S362, one frame time later from the processing performed at step S362. The YCC image signal is written in the memory 105 after several processing such as the correction processing for the distortion of the lens and the vibration proof processing for the image pickup apparatus are performed.

At step S364, the signal processor 106 reads the YCC image signal written in the memory 105 at step S363, one frame time later from the processing performed at step S363. The YCC image signal is written in the memory 107 after the noise reduction processing is performed.

At step S365, the external output portion 110 reads the YCC image signal written in the memory 107 at step S364, one frame time later from the processing performed at step S364. After that, the external output portion 110 converts the format of the YCC image signal in conformity with HDMI, SDI, and a transmission format for image signal such as component video signal and composite video signal, and then outputs the converted YCC image signal to the outside of the image pickup apparatus.

At step S366, the resizing portion 118 reads an YCC image signal from the memory 105, reduces the size of the YCC image signal to the display size on the panel, and then converts the reduced YCC image signal to an RGB image signal.

In the case of the conventional configuration, as illustrated in FIG. 21A, the resizing portion 111 received an image from the signal processor 106, performed image reduction processing for the image, and then causes the image to be stored in the memory 212.

Thus, as illustrated in FIG. 22A, at step S416, the resizing portion 111 reduces the size of the YCC image signal transmitted from the signal processor 106 to the display size on the panel (960 pixels (H)×540 lines (V)).

After that, at step S417, the panel output portion 113 transmitted the image signal read from the memory 212 to the panel to cause the image to be displayed.

This means that there occurs, on the panel, a display delay of three frame times counting from step S410 due to the combination of the time required for step S415 and that required for the processing of output on the panel at step S417. If the frame rate is 60 Hz, a delay of about 50[ms] occurs.

For clarity, steps S410 to S415 correspond to steps S360 to S365.

In this embodiment, at step S367 following step S361, the resizing portion 114 reduces the size of the RCC image signal transmitted from the resizing portion 101 to the display size on the panel (960 pixels (H)×540 lines (V)).

At step S368, the panel output portion 121 transmits the image signal whose format is converted in conformity with the receiving format of the panel to the panel to cause the image to be displayed. Either one of the image for which the same signal processing as that for the recorded image or the image for which signal processing for display aiming to reduce a display delay is selected by the focus checking and switching portion 123 as an image to be displayed on the panel. The signal processor for panel 120 performs several processing for the selected image, such as color adjustment processing and resolution adjustment processing, in conformity with the specifications of the panel.

In the case of the configuration according to this embodiment, the process from step S360 to step S368 is completed within one frame time. This makes it possible to reduce a display delay which occurs when an image being shot is displayed on the display device to one frame time or less. If the image for checking of a focus state of the recorded image is to be displayed, it is possible to check the focus state of the recorded image which is displayed within three frame times.

Each memory includes a memory such as a DRA. The configuration of each memory may be either one of the following: the configuration in which one memory is used with address control or the configuration in which a plurality of memories are used.

For clarity, although not illustrated in the figure, a controller for controlling the synchronization of the driving cycle of the sensor 100 and that of the panel is necessary. It is desirable for the controller to have a configuration in which each of the sensor 100 and the panel can control its driving cycle and delay time. More specifically, such a configuration should ensure that the driving delay amount of the synchronization signal of the driving cycle of the panel falls within a predetermined range on the basis of the driving cycle of the sensor 100 derived from the measurement of the delay amounts of the sensor 100 and the panel. The driving cycle of the sensor 100 and that of the panel are easy to control if they are the same length of cycle, but are not limited to such same length of cycle.

Although not illustrated in the figure, a control block for controlling each block, such as a CPU, is necessary. Such a control block needs to perform, in particular, signal processing, setting adjustment for signal processing for panel, and setting and adjustment for focus checking and switching.

[Embodiment 7]

This embodiment will describe a configuration in which a display delay is reduced by connecting an RGB signal extracted from a portion of the signal processing circuit for recorded image to the processing circuit for displayed image, with an example being a video camera. In this embodiment, the frame rate during driving of the sensor 100 is different from the frame rate during output on the panel.

Figure 13:
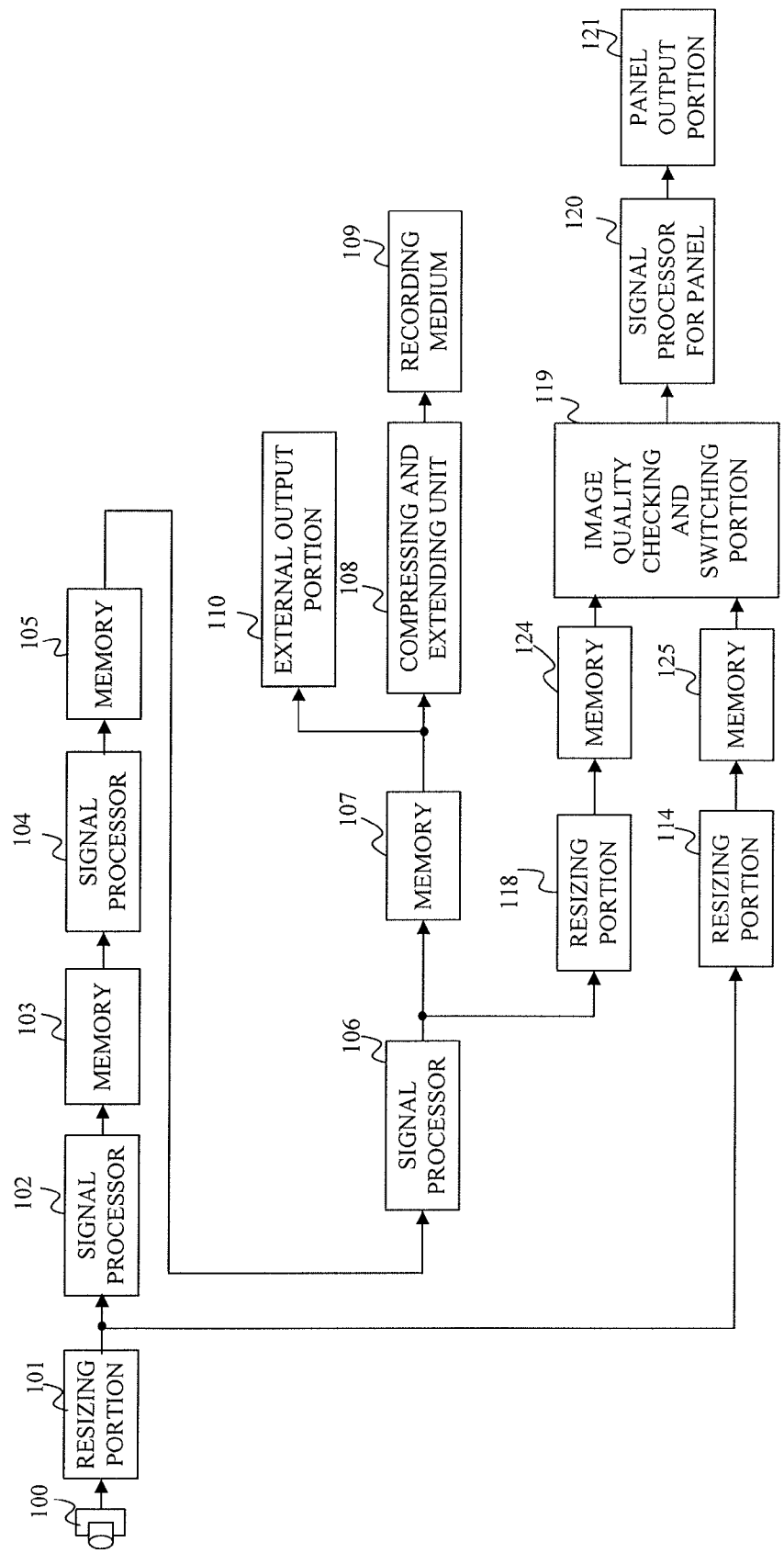
FIG. 13 is a function configuration block diagram illustrating an example of the connection of a main datapath of Embodiment 7.

First, a description will be given of operation occurring in the function configuration of this embodiment with reference to the function configuration block diagram of FIG. 13. A description will be given only of a portion which is different from the configurations of Embodiments 1 to 6, and will be omitted for the same portion as the configurations of Embodiments 1 to 6 to which the same reference numerals as those of Embodiments 1 to 6 are given.

Memories 124 and 125 are blocks necessary for conversion of frame rates.

Different from Embodiments 4 to 7, the resizing portion 118 reads an YCC image signal from the memory 106, reduces the size of the YCC image signal to the display size on the panel, and then converts the reduced YCC image signal into an RGB image signal. When the size of the YCC image is reduced, an image band is controlled by a band limiting filter in both horizontal and vertical directions relative to the YCC image to prevent aliasing of the YCC image. Thereafter, the size of the RGB image is reduced by interpolation method such as bi-cubic interpolation.

A recorded image is processed, at the same frame rate as that observed during the driving of the sensor 100, by the components which operate in each process prior to the processes in which the signal processor 106 and the resizing portion 118 operate, and then stored in the memories 107 and 124.

In the operation in which a display delay is reduced, the components which operate in each process prior to the process in which the resizing portion 114 operates operate at the same frame rate as that observed during the driving of the sensor 100, and then an image is stored in the memory 125.

The image quality checking and switching portion 119 generally selects an image whose display delay is reduced and which is written in the memory 125, and then outputs the image. When the image quality checking and switching portion 119 checks the quality of the image, it selects the image for which the same signal processing as that for the recorded image written in the memory 124 is performed. An image to be displayed is set by the user manually or by the video camera automatically according to shooting conditions. An image for which the same color signal processing as that for the recorded image is displayed during automatic setting in the case where camera operations such as zooming, panning, or mode setting are not performed for a certain period of time or where the number of such camera operations is few. Such cases include those where the number of motions of a shooting object is few, and where the white balance adjustment mode or the manual focus adjustment mode is selected. If the image for which signal processing for display aiming to reduce a display delay is performed is to be displayed, the initial P of "Panel" is displayed at the lower right of the screen as illustrated in FIG. 15A. If the image for which the same signal processing as that for the recorded image is performed is to be displayed, the initial R of "Record" is displayed at the lower right of the screen as illustrated in FIG. 15B.

Figure 14:
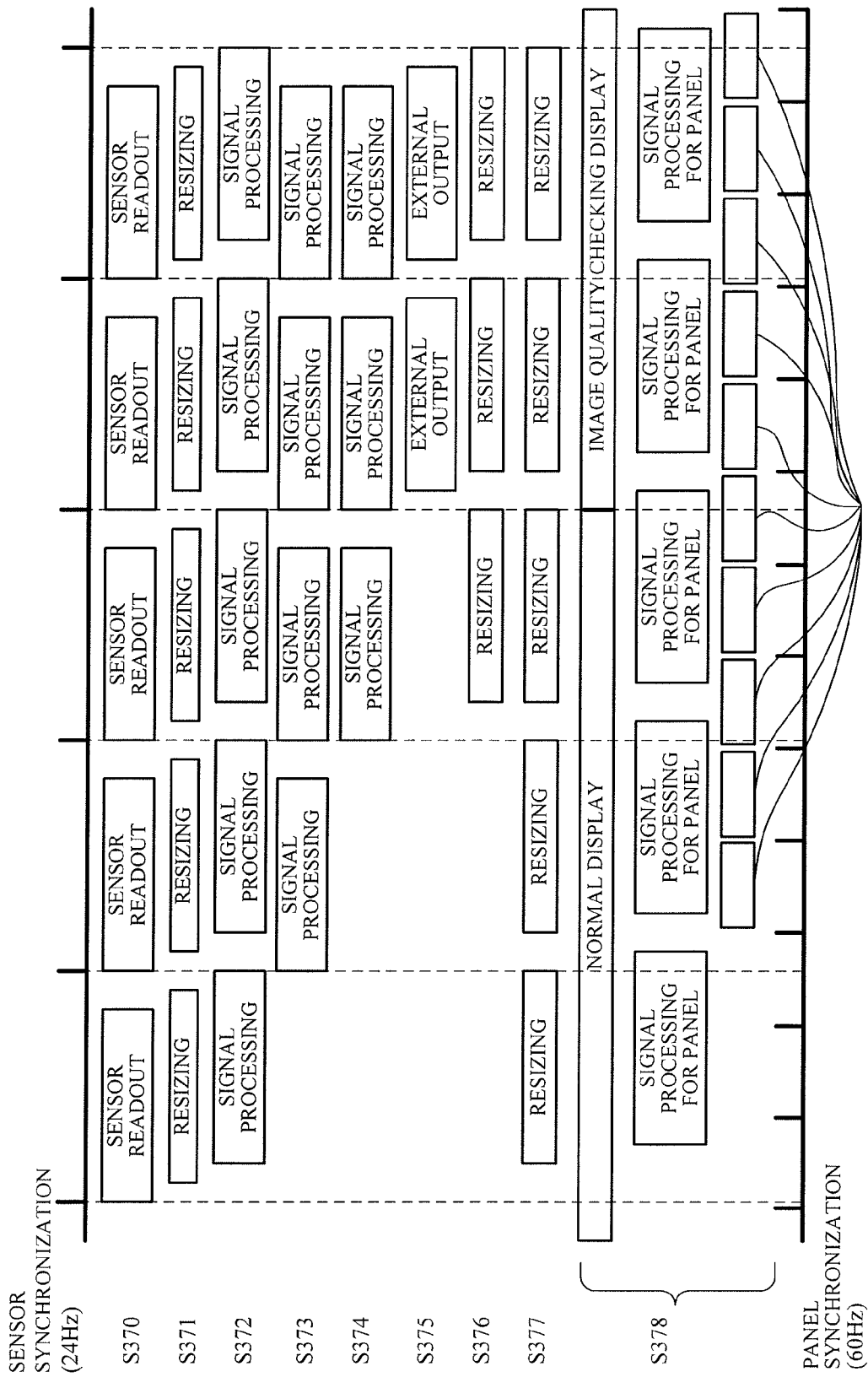
FIG. 14 is a diagram illustrating an example of the operation timing chart of Embodiment 7.

Next, a description will be given of operation timing, referring to FIG. 14 which illustrates the operation timing chart of this embodiment.

In this embodiment, the driving cycle of the sensor 100 and that of the panel are different, but synchronize. The driving cycle of the sensor 100 is 24 Hz and that of the panel is 60 Hz. As illustrated in FIG. 14, this synchronization occurs such that the synchronization timing of the panel whose driving cycle is shorter is later compared with that of the sensor 100. The number of pixels of the sensor 100 is 4096 (H)×2160 (V)=8847360 pixels, and that of the panel is 960 pixels (H)×540 lines (V)=518400 pixels.

At step S370, the sensor 100 outputs an RGB image signal (4096 pixels (H)×2160 lines (V)).

At step S371, the resizing portion 101 reduces the size of the RGB image signal output by the sensor 100 to a size processable by the signal processor 102 (2048 pixels (H)×1080 lines (V)), and then transmits the reduced RGB image signal to the signal processor 102 and the resizing portion 114.

At step S372, the signal processor 102 converts the reduced RGB image signal into a luminance signal (Y) and color difference signals (Cb, Cr). Noise reduction processing may be performed before the Y-C conversion. The converted YCC image signal is written in the memory 103 and transmitted to the resizing portion 111.

At step S373, the signal processor 104 reads the YCC image signal written in the memory 103 at step S372, one frame time later from the processing performed at step S372. The YCC image signal is written in the memory 105 after several processing such as the correction processing for the distortion of the lens and the vibration proof processing for the image pickup apparatus are performed.

At step S374, the signal processor 106 reads the YCC image signal written in the memory 105 at step S373, one frame time later from the processing performed at step S373. The YCC image signal is written in the memory 107 after the noise reduction processing is performed.

At step S375, the external output portion 110 reads the YCC image signal written in the memory 107 at step S374, one frame time later from the processing performed at step S374. After that, the external output portion 110 converts the format of the YCC image signal in conformity with HDMI, SDI, and a transmission format for image signal such as component video signal and composite video signal, and then outputs the converted YCC image signal to the outside of the image pickup apparatus.

At step S376, the resizing portion 118 reduces the size of the YCC image output by the memory 106 to the display size on the panel (960 pixels (H)×540 lines (V)), and then writes the reduced YCC image signal to the memory 124.

In the case of the conventional configuration, as illustrated in FIG. 21A, the resizing portion 111 receives an image from the signal processor 106, performs image reduction processing for the image, and then causes the image to be stored in the memory 212.

Thus, as illustrated in FIG. 22C, at step S436, the resizing portion 111 reduces the size of the YCC image signal transmitted from the signal processor 106 to the display size on the panel (960 pixels (H)×540 lines (V)). After that, at step S437, the panel output portion 113 transmits the image signal read from the memory 212 to the panel to cause the image to be displayed.

This means that there occurs, on the panel, a display delay of three frame times counting from step S430 due to the combination of the time required for step S435 and that required for the processing of output on the panel at step S437. If the frame rate is 60 Hz, a delay of about 50[ms] occurs.

For clarity, steps S430 to S435 correspond to steps S370 to S375.

In this embodiment, at step S377 following step S371, the resizing portion 114 reduces the size of the RCC image signal transmitted from the resizing portion 101 to the display size on the panel (960 pixels (H)×540 lines (V)), and then causes the reduced image to be written in the memory 125.

At step S378, the panel output portion 121 transmits the image signal whose format is converted in conformity with the receiving format of the panel to the panel to cause the image to be displayed. For each one reading frame of the sensor 100, the signal processor for panel 120 reads the same image from the memory 124 or the memory 125 for two or three frames.

In the case of the configuration according to this embodiment, the process from step S370 to step S378 is completed within two frame times. This makes it possible to reduce a display delay which occurs when an image being shot is displayed on the display device to two frame times or less.

Each memory includes a memory such as a DRAM. The configuration of each memory may be either one of the following: the configuration in which one memory is used with address control or the configuration in which a plurality of memories are used.

For clarity, although not illustrated in the figure, a controller for controlling the synchronization of the driving cycle of the sensor 100 and that of the panel is necessary. It is desirable for the controller to have a configuration in which each of the sensor 100 and the panel can control its driving cycle and delay time. More specifically, such a configuration should ensure that the driving delay amount of the synchronization signal of the driving cycle of the panel falls within a predetermined range on the basis of the driving cycle of the sensor 100 derived from the measurement of the delay amounts of the sensor 100 and the panel.

Although not illustrated in the figure, a control block for controlling each block, such as a CPU, is necessary. Such a control block needs to perform, in particular, signal processing and setting adjustment for signal processing for panel.

In addition, output on the panel requires two or three frames for each one reading frame of the sensor 100. Therefore, the management needs to be performed for the frames of the image caused by the resizing portion 118 to be stored in the memory 124, the frames of the image caused by the resizing portion 114 to be stored in the memory 125 and the frames of the image read by the image quality checking and switching portion 119 from the memory 124 or the memory 125.

[Embodiment 8]

An image signal processing apparatus according to an embodiment of the present invention includes a plurality of signal processors for processing an input image signal at each frame period. Each example shows applications to image pickup apparatuses.

A description will be given of a configuration example of the image signal processing apparatus, referring to FIG. 16. The image signal processing apparatus according to an embodiment of the present invention has a configuration in which a first signal processor and a second signal processor are connected parallel to each other. The first signal processor is hereinafter referred to as signal processor 500A, and the second signal processor as signal processor 500B. These signal processors are ASICs (Application Specific Integrated Circuit). With the supposition that an ASIC has the processing ability of 1080/60 P, the components of the signal processors 500A and 500B which have the same functions are indicated with the letter A or B added to the end of their reference letter to distinguish them.

An image sensor 501 is an image pickup element composed of, for example, a CCD (Charge Coupled Element) or a CMOS (Complementary Metal Oxide Semiconductor). Although omitted in the figure, adjustment of an incident light intensity and a focus state is carried out for an object light passing through a group of lenses which constitute an image pickup optical system. The image sensor 501 photo-electrically converts a formed object image and outputs an analog voltage signal corresponding to the light intensity of each pixel. The image pickup element has, at its each pixel, a color filter of R (red), G (green), or B (blue) which is arranged in a predetermined array, e.g., a bayer or honey-comb array, and used to produce an R, G, or B image signal, respectively. For higher speed output, an RGB image signal is output, in some cases, by performing a pixel combination processing in which the outputs of multiple pixels are combined to obtain one output image. A CDS/AD portion 502 performs CDS (Correlated Double Sampling) and AD (Analog-Digital Conversion) to convert an image signal output by the image sensor 501 into a digital signal. The digitalized signal is output to an input terminal 503A of the signal processor 500A and to an input terminal 503B of the signal processor 500B.

A description will be given of the configuration of the signal processor 500A.

A digital image signal is input via the input terminal 503A to a switch portion 504A, a resizing processing portion 524, and an AF (Auto Focus) and AE (Auto Exposure) processing portion 520. Each portion is connected parallel to each other. As described later, the switch portion 504A of the signal processor 500A and the switch portion 504B of the signal processor 500B alternately switch on and switch off. These switching operations allows each signal processor to process an image signal output by the image sensor 501 whose frame rate is 24 fps for 12 fps. When the switch portion 504A switches on, the digital image signal is temporally stored in a DRAM 505A. DRAM is the abbreviation of "Dynamic Random Access Memory".

A development processing portion 506A first reads the digital image signal stored in the DRAM 505A, and then performs several processing for the RGB image signal including offset adjustment, gain adjustment, and gamma correction adjustment. Next, the RGB image signal is converted into a luminance signal (Y) and color difference signals (Cb, Cr), and then stored in a DRAM 507A as an YCC image signal.

A geometric deformation processing portion 508A reads the YCC image signal from the DRAM 507A, and then performs, for example, correction processing for the distortion of the lens, and vibration proof processing for the image pickup apparatus. The correction processing for the distortion is an example of correction processing for distorted images. Correction processing for an image distortion caused by, for example, camera shake is performed through the vibration proofing processing by the image pickup apparatus. The processed signal is stored in a DRAM 509A. A 510A for performing processing such as NR (Noise Reduction) reads the YCC image signal from the DRAM 509A, and performs noise reduction processing for the YCC image signal. The processed signal is stored in a DRAM 512A.

The signal processor 500B performs the same processing as those carried out by the signal processor 500A, for every other frame of an image being shot. A description for such processing will be omitted. The processed signal is stored in a DRAM 512B. The image signal stored in the DRAM 512B is transmitted from a terminal 514B of the single processor 500B via a terminal 514A of the single processor 500A to the DRAM 512A, at the timing described later, to be restored to an image signal with a frame rate of 24 fps. That is to say, the DRAM 512A stores, in each frame period, an image signal processed by the signal processors 500A and 500B.

An external output portion 515 of the signal processor 500A reads an YCC image signal from the DRAM 512A, and then converts the format of the YCC image signal. The converted YCC image signal is output via a terminal 516 to the outside of the image pickup apparatus and then transmitted to an external device. Such format conversion processing is performed in conformity with HDMI, SDI, and a transmission format for image signal such as component signal and composite signal. HDMI is the abbreviation of "High-Definition Multimedia Interface" and SDI is the abbreviation of "Serial Digital Interface". A compressing and extending unit 517 reads the YCC image signal from the DRAM 512A, and then performs compressing and coding processing for the YCC image signal. The compressed and coded signal is recorded on a recording medium 519.

The AF and AE processing portion 520 performs bandpass filter processing for an input image signal to exert a high definition signal component. The exerted signal component is transmitted, as an AF evaluation signal for indication of an in-focus state, to a CPU (Central Processing Unit) of a controller 530 to be used to perform an AF function. The AF and AE processing portion 520 exerts the average value of a luminance level from the input image signal. A signal indicating the average value of the luminance level is transmitted to the controller 530 to be used to perform an AE function. As described above, the AF and AE processing portion 520 is provided at the signal processor 500A and processes, in all frames, an image signal obtained upstream from the switch portion 504A. This prevents delay in processing, leading to a higher responsivity.

A resizing processing portion 524, a development processing portion 525, a DRAM 526, a signal processor for panel 518 and a panel output portion 521 together constitute a signal processor for display. The signal processor for display resizes an image signal. In the image resizing processing according to this embodiment, the resizing processing portion 524 performs image reduction processing. The resizing processing portion 524 reduces the size of an RGB image signal obtained from the input terminal 503A while correcting the barycenter of each of R (red), G (green), and B (blue), and then outputs the resulting RGB image signal to the development processing portion 525 of the next stage. Resizing processing for the display panel is possible to be performed with the use of a delay line for several lines. In the case of a FIR (Finite Impulse Response) filter configuration, the delay time caused by this processing is a half of that of the above-described delay line. The development processing portion 525 performs offset adjustment, gain adjustment and gamma correction processing for the RGB image signal, and then converts the RGB image signal into a luminance signal (Y) and color difference signals (Cb, Cr). Since the delay line is not required for the development processing for the display panel, a delay time in signal processing of several clocks occurs. The YCC image signal is temporally written in the DRAM 526.

The signal processor for panel 518 reads the YCC image signal which is output by the development processing portion 525 and whose size is reduced to the display size on the panel from the DRAM 526, and then performs several processing including color adjustment processing and resolution adjustment processing in conformity with the specifications of a display panel 527. The panel output portion 521 performs display signal output processing, and then coverts the format of the YCC image signal in conformity with the receiving format of the display panel 527. The converted YCC image signal is transmitted via a terminal 522 to the display panel 527. This causes an image being shot to be displayed.

The controller 530 controls the synchronization timing of the first frame frequency of an input image signal and the synchronization timing of the second frame frequency of an image signal for the display panel. This means that the control of the synchronization of the driving cycle of the image sensor 501 and that of the display panel 527 causes the driving cycle and the delay time of the image sensor 501 and those of the display panel 527 to be controlled. More specifically, there are provided a measuring portion for measuring a delay amount between the synchronization signal of the image sensor 501 and that of the display panel 527 and a synchronization controller for ensuring that the delay amount of the synchronization signal of the driving cycle of the display panel 527 falls within a predetermined range on the basis of the driving cycle of the image sensor 501. In addition, the controller 530 includes a known controlling block employing, for example, a CPU. The controlling block performs setting adjustment for the development processing portion 506, the geometric deformation processing portion 508, the post processing portion 510, and the signal processor for panel 518.

Next, a description will be given of a comparative example to this embodiment, referring to FIG. 21C. A sensor 901 is indicated as a sensor 501 in FIG. 16 and a CDS/AD portion 902 is indicated as a CDS/AD portion 502 in FIG. 16. Components 903A to 910A, 912A, 915 to 917, and 919 within a signal processor 900A are the same as components 503A to 510A, 512A, 515 to 517, and 519 within the signal processor 500A illustrated in FIG. 16. Likewise, components 903B to 910B, and 912B within a signal processor 900B are the same as components 503A to 510B, and 512B within the signal processor 500B illustrated in FIG. 16. Thus, a description will be given of a portion of the configuration of the signal processing apparatus illustrated in FIG. 21C which is different from the configuration according to this embodiment.

Figure 21C:
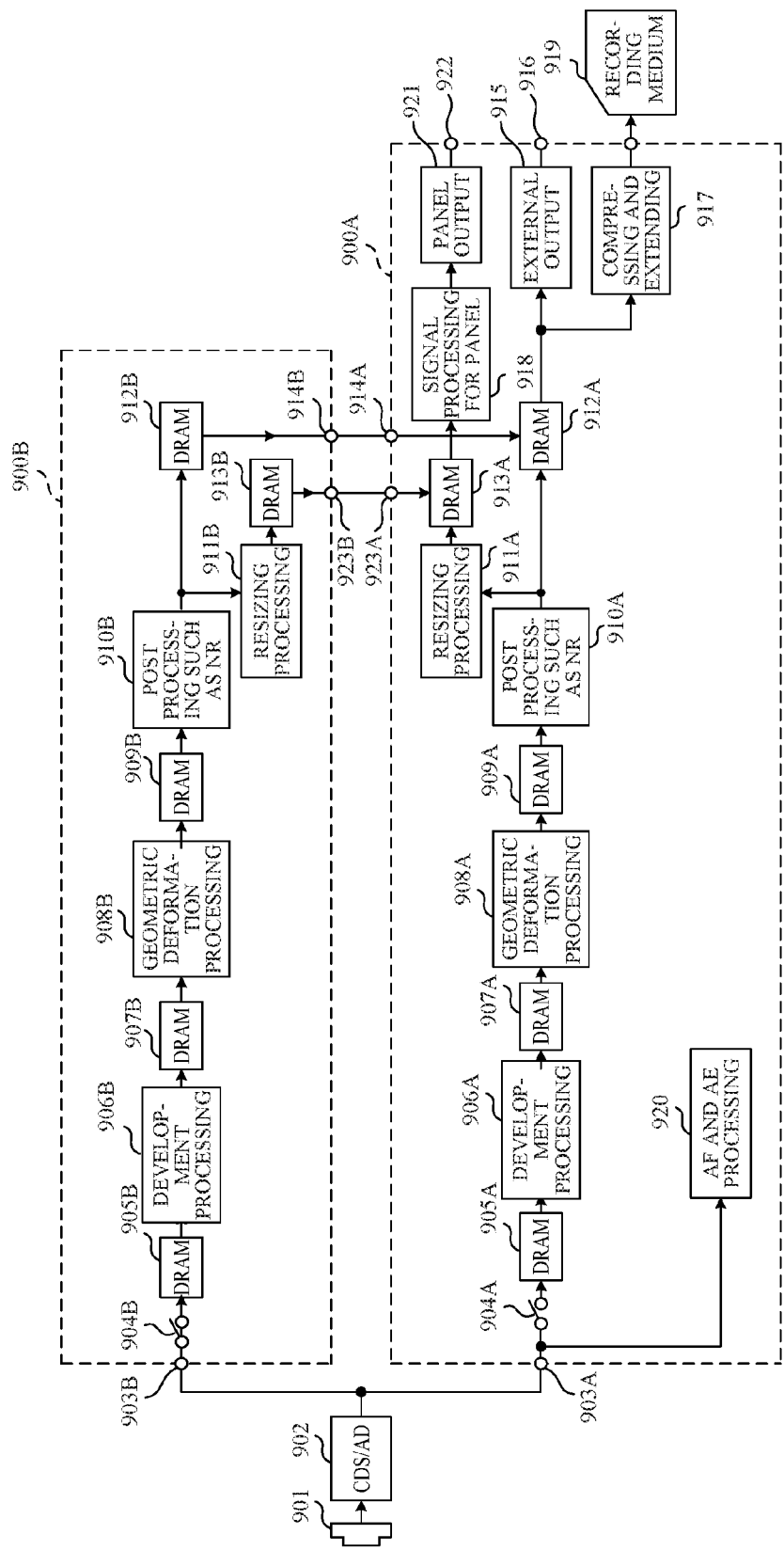

Each of the outputs of the post processing portions 910A and 910B illustrated in FIG. 21C is written in the DRAMs 912A and 912B, and transmitted to the resizing processing portions 911A and 911B. The resizing processing portions 911A and 911B reduces the image size of each of the input YCC image signal to the display size on the display panel 527. The reduced YCC image signal is transmitted to and stored in DRAMs 913A and 913B. The YCC image signal which is read from the DRAM 913B of the signal processor 900B and whose size is reduced to the display size on the display panel 527 is output from a terminal 923B, and then transmitted via a terminal 923A of the signal processor 900A to the DRAM 913A. This results in the restoration of an image signal with a frame rate of 24 fps. A signal processor for panel 918 reads the YCC image signal whose size is reduced to the display size on the display panel 527 from the DRAM 913A, and then performs several processing for the reduced YCC image signal, such as color adjustment processing and resolution adjustment processing, in conformity with the specifications of the display panel 527. A panel output portion 921 converts the format of the YCC image signal in conformity with the receiving format of the display panel 527. The converted YCC image signal is transmitted via a terminal 922 to the display panel 527. This causes an image to be displayed on the screen.

Next, a description will be given of the operation of the image signal processing apparatus of this embodiment, referring to FIG. 17.

In this embodiment, suppose the first frame frequency corresponding to the driving cycle of the image sensor 501 and the second frame frequency corresponding to the driving cycle of the display panel 527 synchronize at 24 Hz. As illustrated in FIG. 17, this synchronization occurs such that the synchronization timing of the panel is later compared with that of the image sensor 501. The number of pixels of the image sensor 501 is 8847360 pixels (4096 (H)×2160 (V)), and that of the display panel 527 is 518400 pixels (960 pixels (H)×540 lines (V)). Steps S610 to S615 and S620 to S623 depict each process of processing. Steps related to the signal processer 500A are indicated with the letter A and steps related to the signal processer 500B are indicated with the letter B to distinguish them. Frames 1 to 5 depict the first to fifth frames of an input image signal.

At step S610A (step is hereinafter abbreviated as "S"), the output of the image sensor 501 is processed by the CDS/AD portion 502 to be output as an RGB image signal. First, a description will be given of the processing of an image signal of the first frame.

Figure 17:
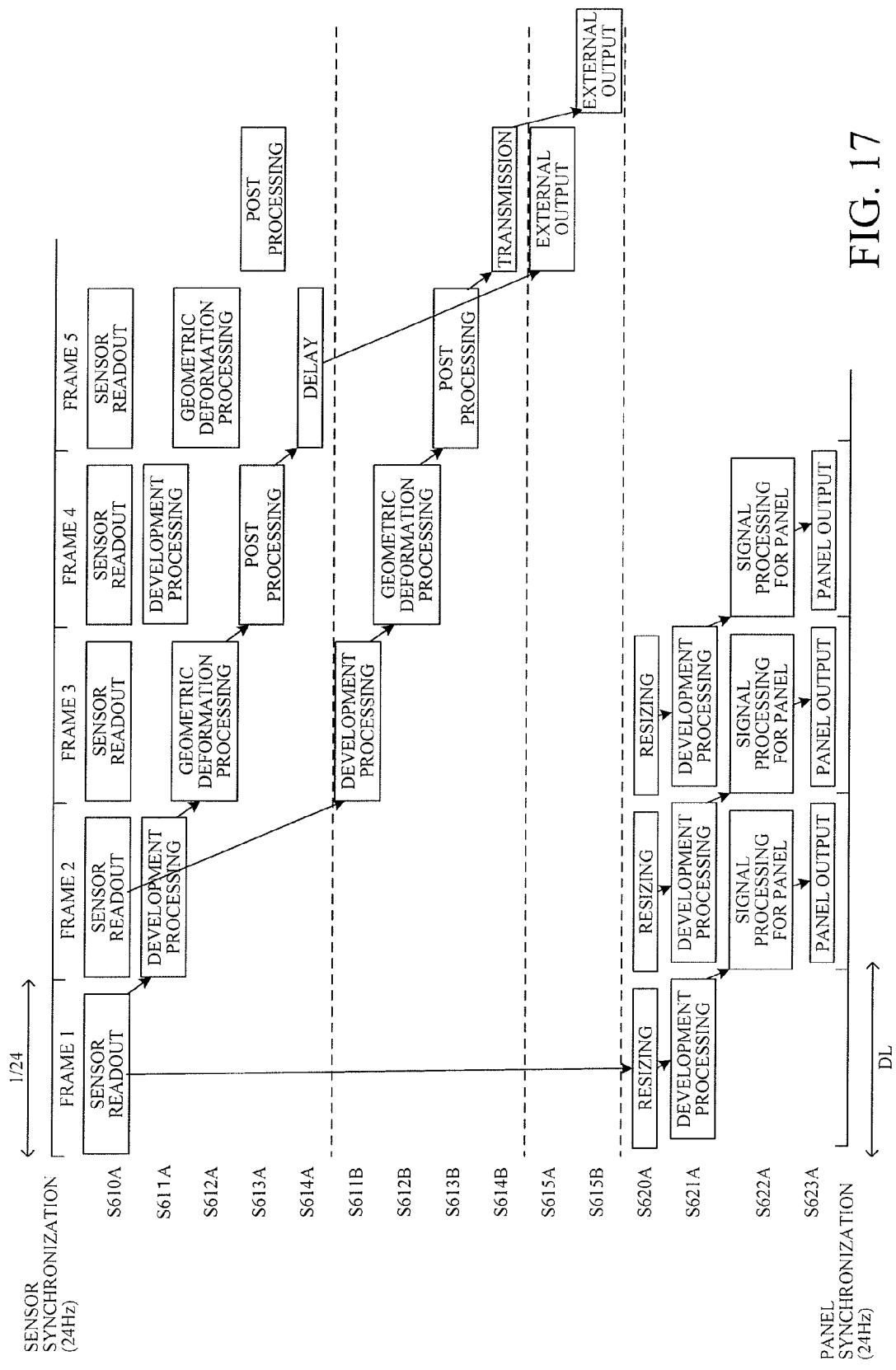
FIG. 17 is a diagram illustrating an example of the operation timing chart of Embodiment 8.

The closing of the switch portion 504A of the signal processor 500A causes the image signal of the frame 1 illustrated in FIG. 17 to be stored in the DRAM 505A. At step S 611A, the development processing portion 506A converts the RGB image signal into a luminance signal (Y) and color difference signals (Cb, Cr). The YCC image signal is stored in the DRAM 507A.

At next step S612A, the YCC image signal stored in the DRAM 507A at step S611A is read, one frame period later from when the processing at step S611A is started. The geometric deformation processing portion 508A reads the YCC image signal, and then performs, for example, correction processing for the distortion of the lens, and vibration proof processing for the image pickup apparatus. The processed YCC image signal is stored in the DRAM 509A. At step S613A, the YCC image signal stored in the DRAM 509A at step S612A is read, one frame period later from when the processing at step S612A is started. The post processing portion 510A performs several processing for the read YCC image signal including noise reduction processing. The processed YCC image signal is stored in the DRAM 512A. At step S614A, the DRAM 512A delays the YCC image signal with a delay time of one frame period. This processing is performed to synchronize timings by delaying the YCC image signal for the transmission time of the signal processor 500A described later to adjust the times of the signal processors 500A and 500B.

At step S615A, the YCC image signal stored in the DRAM 512A at step S613A is read, two frame periods later from when the processing at step S613A is started. The external output portion 515 converts the format of the YCC image signal in conformity with the image signal transmission format, and then outputs the converted YCC image signal to the outside of the image pickup apparatus. When recording processing is to be performed, the compressing and extending unit 517 reads the YCC image signal from the DRAM 512A, performs compressing and coding processing for the YCC image signal in conformity with a recording format, and then records the YCC image signal on the recording medium 519.

Next, a description will be given of the image signal of the second frame.

The closing of the switch portion 504B of the signal processor 500B causes the image signal of the frame 2 illustrated in FIG. 17 to be stored in the DRAM 505B. At step S 611B, the development processing portion 506B converts the RGB image signal into a luminance signal (Y) and color difference signals (Cb, Cr). The YCC image signal is stored in the DRAM 507B.

At next step S612B, the YCC image signal stored in the DRAM 507B at step S611B is read, one frame period later from when the processing at step S611B is started. The geometric deformation processing portion 508B reads the YCC image signal, and then performs, for example, correction processing for the distortion of the lens, and vibration proof processing for the image pickup apparatus. The processed YCC image signal is stored in the DRAM 509B. At step S613B, the YCC image signal stored in the DRAM 509B at step S612B is read, one frame period later from when the processing at step S612B is started. The post processing portion 510B performs several processing for the read YCC image signal including noise reduction processing. The processed YCC image signal is stored in the DRAM 512B.

At step S614B, the YCC image signal stored in the DRAM 512B is transferred via the terminals 514B and 514A to the signal processor 500A, and then stored in the DRAM 512A. If an image data to be transmitted and received is transmitted and received within 1/24 seconds (a length of one frame period) on the condition that the size of the image data is 1920×1080 and that the capacity of the YCC image data consisting of 8-bit parts is 4.15 MB (Megabyte), the transmission rate in this transmission is 99.6 MB/s.

At step S615B, the YCC image signal transferred to the signal processor 500A and stored in the DRAM 512A at step S614B is read, one frame period later from when the processing at step S614B is started. The external output portion 515 converts the format of the YCC image signal in conformity with the image signal transmission format, and then outputs the converted YCC image signal to the outside of the image pickup apparatus. The compressing and extending unit 517 reads the YCC image signal from the DRAM 512A, performs compressing and coding processing for the YCC image signal in conformity with the recording format, and then causes the compressed and coded image signal to be recorded on the recording medium 519.

As described above, an image signal is processed by the signal processor 500A when being in odd-number frames 1, 3, 5 . . . and processed by the signal processor 500B when being in even-number frames 2, 4, 6 . . . . This permits handling of an image data whose capacity requires more than one chip to process.

At step 620A, the resizing processing portion 524 reduces the size of the RGB image signal input from the input terminal 503A. At next step S621, the development processing portion 525 converts the reduced RGB image signal into an YCC image signal. The YCC image signal is stored in the DRAM 526. At step S622A, the signal processor for panel 518 reads the YCC image signal from the DRMA 526, and then performs several processing including color adjustment processing and resolution adjustment processing in conformity with the specifications of the display panel 527. At step S623A, the panel output portion 521 converts the format of the YCC image signal in conformity with the receiving format of the display panel 527, and then transmits the converted YCC image signal to the display panel 527. This causes an image to be displayed on the display panel 527.

In this embodiment, the time required in each frame for the processing of a signal used to display an image, i.e., the time required for the processing performed at steps S610A to 623A, is slightly more than one frame period (See DL). This means that the display delay time starting from the processing of the image signal of an image being shot by using the image sensor 501 and ending with the display of the image on the display apparatus is slightly more than one frame period.

Next, a description will be given of the operation timing of the conventional embodiment illustrated in FIG. 21C, referring to FIG. 22D. Steps S810 to S816, S822, and S823 depict each process of processing. Steps related to the signal processor 900A are indicated with the letter A and steps related to the signal processer 900B are indicated with the letter B to distinguish them. A description will be given mainly of a portion which is different from FIG. 17.

At step S813A, for the image signal in the frame 1, the post processing portion 910A obtains a signal written in the DRAM 912A. At step 816A, the resizing processing portion 911A performs resizing processing in conformity with the image size on the display panel 527. The resizing processing for the display panel 527 is performed in quasi real-time while causing a delay time of several lines, but does not require a frame delay. The processed YCC image signal is stored in the DRAM 913A. For the image signal in the frame 1, the signal processor 900B performs the same processing. The resulting YCC image signal is stored in the DRAM 913B at step 816B. The YCC image signal which is read from the DRAM 913B and is to be used for the display panel 527 is sequentially transferred via the terminals 923B and 923A to the signal processor 900A without a frame delay and is stored in the DRAM 913A. This causes the YCC image signal to be restored as an YCC image signal with a frame rate of 24 fps. At step 822A, the signal processor for panel 918 performs several processing for the YCC image signal read from the DRAM 913A, including color adjustment processing and resolution adjustment processing, in conformity with the specifications of the display panel 527. At step S823A, the panel output portion 921 converts the format of the YCC image signal in conformity with the receiving format of the display panel 527 and transmits the converted YCC image signal to the display panel 527. This causes an image to be displayed on the screen of the display panel 527.

Figure 22D:
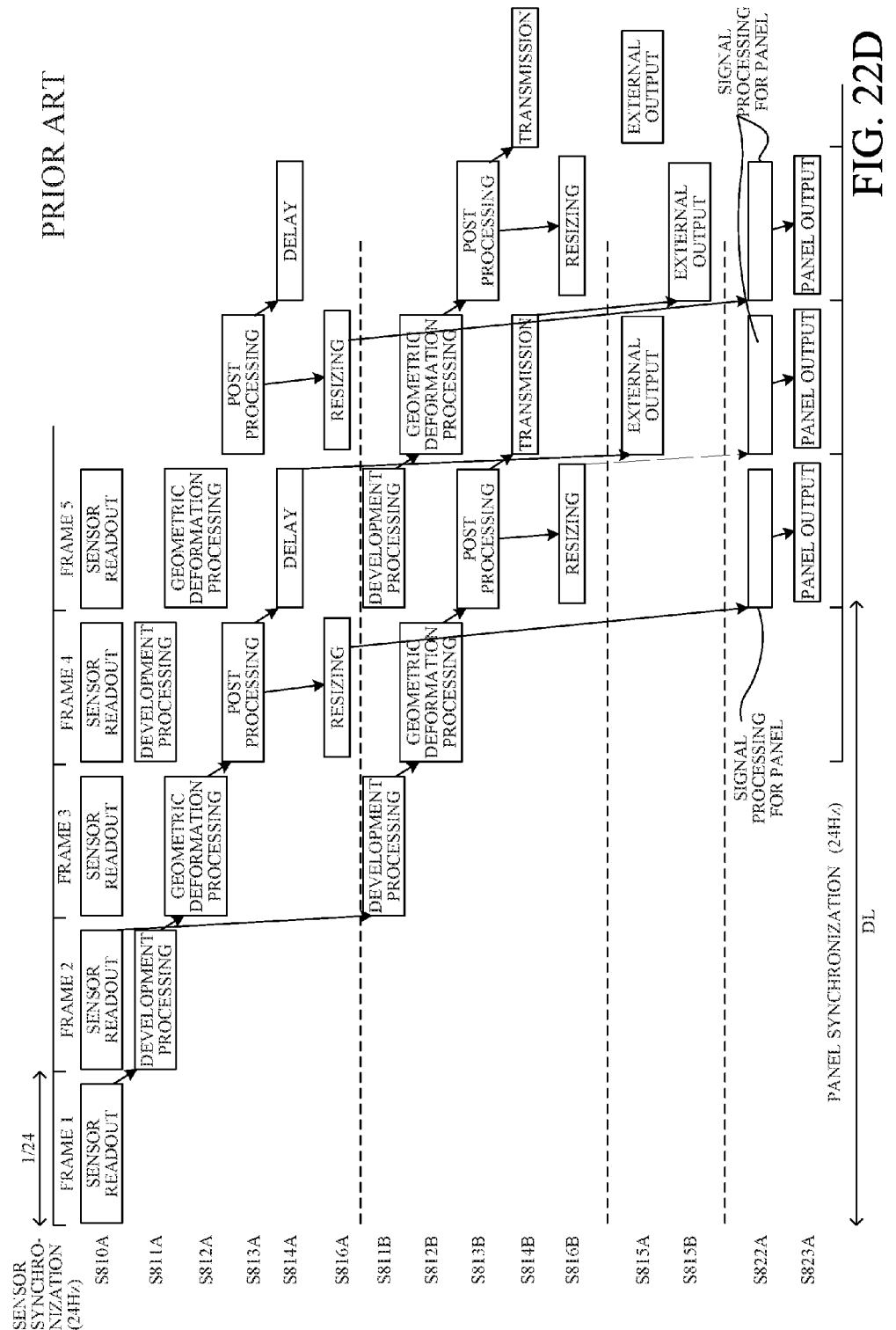

In the conventional embodiment illustrated in FIG. 22D, an image signal to be output to the display panel 527 is produced after the results of the processing alternately performed by the signal processors 900A and 900B are combined into one. This results in a prolonged display delay time. In the processing of an image signal performed in each frame, a display delay time equivalent to four frame periods occurs during the period from step S810A to the beginning of step S823. This means that if the frame frequency is 24 Hz, the display delay time is about 166 ms.

In contrast, this embodiment can shorten a display delay time which occurs when an image being shot is output to the display apparatus to slightly more than one frame period by processing an image signal obtained at a branch point located upstream from where input to the switch portion 504A of the signal processor 500A is made. The shortening of a display delay time which occurs when an image being shot is output to the display apparatus allows a user to view a displayed image without getting an awkward feeling caused due to the display delay.

In this embodiment, each DRAM in the signal processors has been described as an individual device for the convenience of explanation. However, the configuration according to this embodiment is not limited to that described above, and may be one in which a DRAM is shared with address control. In this embodiment, the driving cycle of the image sensor 501 and that of the display panel 527 are configured to be the same, permitting easier control. This embodiment shows, as an example, the configuration in which an image signal is processed by the first signal processor 500A when being in odd-number frames and processed by the second signal processor 500B when being in even-number frames. The configuration according to this embodiment is not limited to that described above, and may be a configuration in which an image signal is time-divided in each frame by three or more signal processors to be processed individually. Likewise, in this embodiment, the configuration, as an example, has been described in which the signal processor for panel 518 for performing recording signal processing and external output processing is provided within the first signal processor 500A. However, the configuration according to this embodiment may be one in which another type of circuit portion is employed as the signal processor for panel 518.

[Embodiment 9]

Next, a description will be given of Embodiment 9 of the present invention. For clarity, the detailed description of the same components as those employed in Embodiment 8 will be omitted, with the reference numerals which have been already used being used. A description will be given mainly of a portion which is different from Embodiment 8.

In Embodiment 9, a display delay time is shortened by outputting an RGB image signal to an image processing circuit for panel after extracting the RGB image signal from a portion of a signal processing circuit for a recorded image. A configuration will be described below in which the driving frame frequency of the image sensor 501 is different from that of the display panel 527. Suppose the first frame frequency corresponding to the driving cycle of the image sensor 501 is 24 Hz and the second frame frequency corresponding to the driving cycle of the display panel 527 is 60 Hz.

Figure 18:
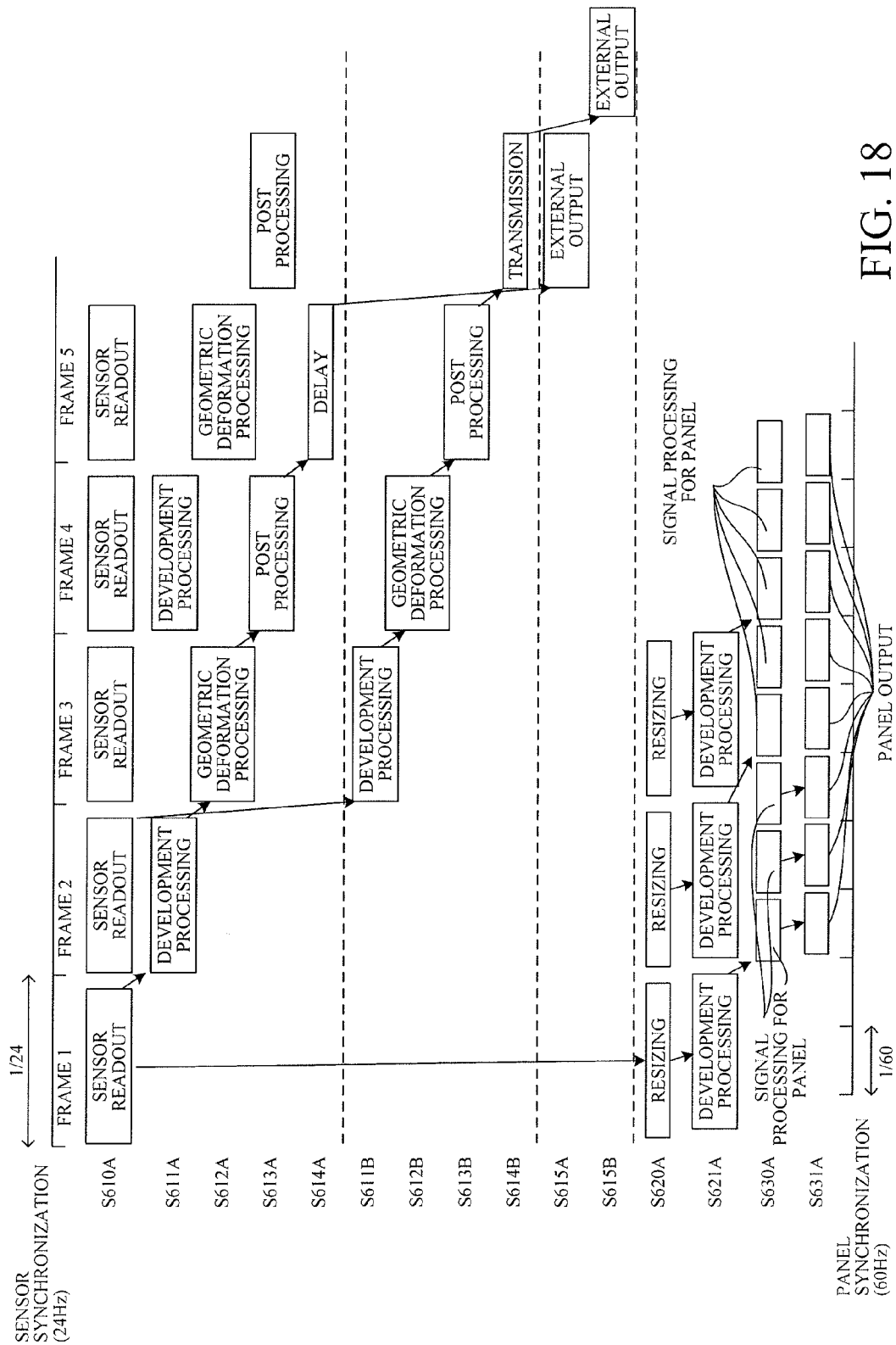
FIG. 18 is a diagram illustrating an example of the operation timing chart of Embodiment 9.

Referring to FIG. 18, a description will be given of the operation timing of an image signal processing apparatus of Embodiment 9. Since Steps S610A to S615A, S620A, S621A and S611B to S615B is the same FIG. 17, an explanation after S630A is provided.

At step S630A, the signal processor for panel 518 reads an image signal from the DRAM 526, with a frame frequency being 60 Hz. This process will be described referring to FIG. 19.

Figure 19:
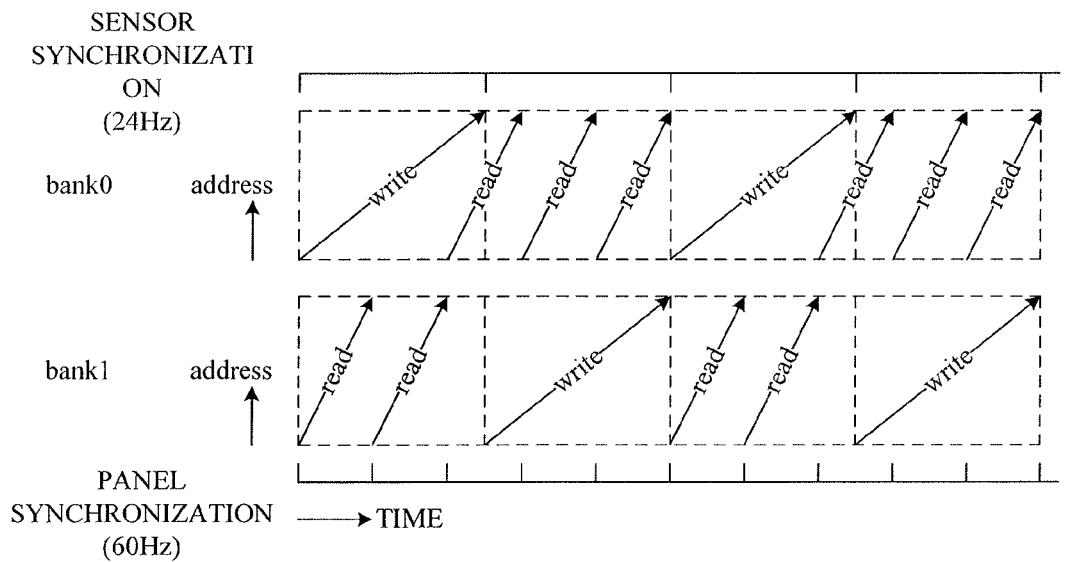
FIG. 19 is a diagram explaining an access to a DRAM in Embodiment 9.

In FIG. 19, the horizontal axis is a time axis (suppose the right direction is a direction in which time passes) and the vertical axis indicates the memory address of the DRAM 526. The DRAM 526 includes a first bank (bank 0) and a second bank (bank 1). Arrows indicated with the word "write" depict write accesses made with a frequency being 24 Hz when the development processing portion 525 writes data in each bank. In FIG. 19, an operation is repeated in which data is written in the bank 0 and then next data is written in the bank 1. In this operation, an image data has a structure suitable for raster-scanning and data obtained in each frame is sequentially transferred to a memory with the movement from the upper portion to the lower portion of the screen. Arrows indicated with the word "read" depict read accesses made with a frequency being 60 Hz when the signal processor for panel 518 reads data from each bank. The gradient of each arrow indicated with the word "read" is greater than that of each arrow indicated with the word "write". This means that the reading speed is larger than the writing speed. As illustrated in FIG. 18, two read accesses are made to the bank 1 and three write accesses are made to the bank 0. The panel output portion 521 reads from the DRAM 126 the same image data appearing in two or three frames every data of one frame read from the sensor 501, and then transmits the image data to the display panel 527 (step S631A, FIG. 18). At this time, the phase of the synchronization timing of the image sensor 501 at a frame frequency of 24 Hz and the synchronization timing of the display panel 527 at a frame frequency of 60 Hz is controlled by the controller 530 so as to be a predetermined phase relationship. This control permits the setting in which the overlapping (passing) of the address at the time of writing which is indicated by each arrow with the word "write" and the address at the time of reading which is indicated by each arrow with the word "read" is avoided.

In Embodiment 9, it is possible to set a configuration in which the frame frequency of the image sensor 501 and that of the display panel 527 are different values with an image which appears in a plurality of frames being displayed within one screen of the display panel 527.

[Embodiment 10]

Next, a description will be given of Embodiment 10 of the present invention.

In Embodiment 10, the configuration, as an example, will be shown in which the driving frame frequency of the image sensor 501 and that of the display panel 527 are different. Suppose the second frame frequency is an integral multiple of the first frame frequency in the following description. The configuration in which the output frame frequency of the display panel 527 is n (natural number) times of the frame frequency observed during the driving of the image sensor 501 will be explained. Suppose n=2, the driving frame frequency of the image sensor 501 is 30 Hz, and the output frame frequency of the display panel 527 is 60 Hz.

Figure 16:
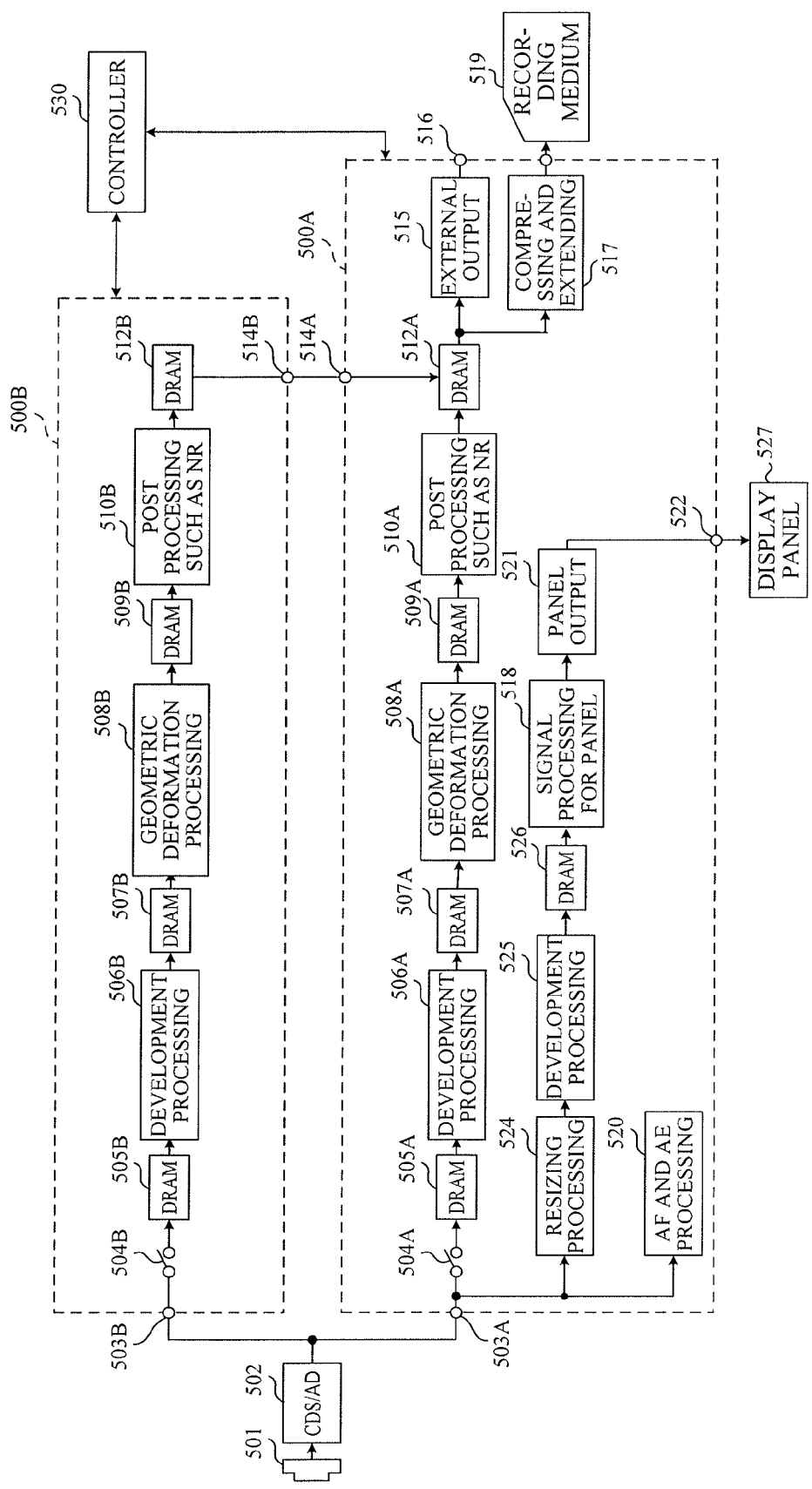
FIG. 16 is a block diagram illustrating an example of the function configuration of Embodiment 8.

The block configuration of this embodiment is the same as that illustrated in FIG. 16. The operation timing of this embodiment is the same as that illustrated in FIG. 18, but the method for accessing a memory is different from that illustrated in FIG. 19. Thus, a description will be given of this difference, referring to FIG. 20.

In the configuration of this embodiment, bank is a sole memory bank at which the development processing portion 525 writes an YCC image signal in the DRAM 526 and the signal processor for panel 518 reads the YCC image signal from the DRAM 526. The addresses to be assessed are different.

Figure 20:
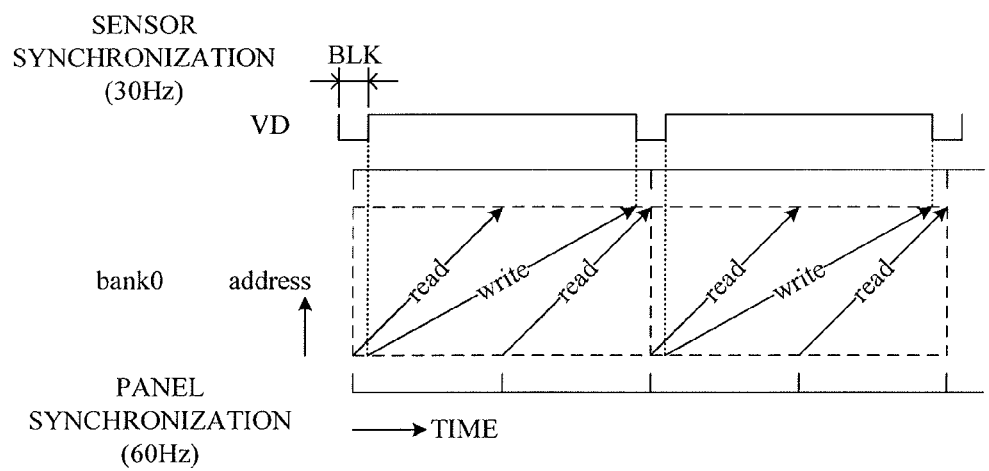
FIG. 20 is a diagram explaining an access to a DRAM in Embodiment 10.

The letters VD and BLK in FIG. 20 indicate a frame signal and a blanking period, respectively. At the lower portion thereof, the horizontal axis is a time axis (suppose the right direction is a direction in which time passes) and the vertical axis indicates the memory address of the DRAM 526. Arrows in the diagonally right direction indicated with the word "write" depict write accesses made with a frequency being 30 Hz when the development processing portion 525 writes an image data in the DRAM 526. A predetermined interval, e.g., a blanking period BLK equivalent to 10% of the frame frequency of the image sensor 501, is provided between a certain frame and the following frame. A period during which a frame signal VD is at L (Low) level is referred to as blanking period BLK. Arrows indicated with the word "write" depict write accesses to bank 0, a memory bank, which are made during a period other than the blanking period BLK. An image data has a structure suitable for raster-scanning and data obtained in each frame is sequentially transferred to the DRAM 526 with the movement from the upper portion to the lower portion of the screen. Arrows indicated with the word "read" depict read accesses made with a frequency being 60 Hz when the signal processor for panel 518 reads data from the DRAM 526. In this case, the reading speed is twice as fast as the writing speed. The phase of the synchronization timing of the image sensor 501 at a frame frequency of Hz and the synchronization timing of the display panel 527 at a frame frequency of 60 Hz is controlled so as to be a predetermined phase relationship. This control can prevent a reading address from passing through a writing address with the setting in which the writing address and the reading address do not overlap on the bank 0.

In Embodiment 10, the same effect as that of Embodiment 9 can be achieved with one memory bank. Moreover, a display delay time caused due to the meditation of a DRAM can be decreased to a half of one frame period at the upper portion and to almost zero at the lower portion of the screen. Thus, the total display delay time relative to the driving frame frequency of the sensor 501 can be reduced to equal to or less than a half of the length of one frame period (where n=2).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2013-020333, filed on Feb. 5, 2013, and 2013-000157, filed on Jan. 4, 2013, which are hereby incorporated by reference herein in their entirety.

What is claimed is:

1. An image signal processing apparatus including a plurality of signal processors, each of the signal processors being configured to process, in its corresponding at least one frame period, an input, image signal, the image signal processing apparatus comprising:
   a memory configured to store, in each frame period, the image signal processed by the signal processors;
   a signal processor for the display arranged in parallel relative to the signal processors, and configured to change the image size of the image signal to an image size intended for display and then to output the image signal; and
   a controller configured to control the synchronization timing of a first frame frequency of the output image signal and the synchronization timing of a second frame frequency of the image signal whose image size is intended for display.

2. The image signal processing apparatus according to claim 1, wherein the signal processors include a first signal processor configured to process the image signal in each odd-number flame and a second signal processor configured to process the image signal in each even-number frame.

3. The image signal processing apparatus according to claim 1, wherein the signal processor for the display includes an image resizer configured to perform image reduction processing of the input image signal branched upstream from each of the first signal processor and the second signal processor.

4. The image signal processing apparatus according to claim 1, wherein the signal processors are configured to perform at least one of the noise reduction. processing, an image signal conversion processing, the image distortion correction processing, or a camera shake correction processing.

5. The image signal processing apparatus according to claim 1, wherein the signal processor for the display is configured to convert the image signal whose image size has been resized into a luminance signal and color difference signals, to write the luminance signal and the color difference signals in a memory bank of the memory, and then to process the luminance signal and the color difference signals, both of which are read from the memory bank, to be those intended for use at the time of display.

6. The image signal processing apparatus according to claim 5, wherein the first frame frequency observed when an image signal is written in the memory bank and the second frame frequency observed when the image signal is read from the memory bank are different.

7. The image signal processing apparatus according to claim 6, wherein the second frame frequency is an integral multiple of the first frame frequency.

8. The image signal processing apparatus according to claim 3 further comprising:
a second memory configured to store the input image signal,
wherein the signal processors read the input image signal from the second memory and process the input image signal, and
wherein the image resizer performs the image reduction processing of the input image signal before the input image signal is stored in the second memory.

9. An image pickup apparatus including an image pickup unit, a plurality of signal processors, each of the signal processors configured to process, in its corresponding at least one frame period, an image signal output by the image pickup unit, and a display configured to display an image being shot, the image pickup apparatus comprising:
a memory configured to store, in each frame period, the image signal processed by the signal processors;
a signal processor for the display arranged in parallel relative to the signal processors, and configured to change the image size of the image signal to an image size intended for display and then to output the image signal on the display; and
a controller configured to control the synchronization timing of a first frame frequency corresponding to the driving cycle of the image pickup unit and the synchronization timing of a second frame frequency corresponding to the driving cycle of the display.

10. A control method of an image signal processing apparatus performed by the image signal processing apparatus, the image signal processing apparatus including a plurality of signal processors, each of the signal processors being configured to process, in its corresponding at least one frame period, an input image signal, the method comprising the steps of:
storing in a memory, in each frame period, the image signal processed by the signal processors;
reading and outputting the image signal stored in the memory;
changing the image size of the image signal to an image size intended for display and then outputting the image signal by the signal processor for the display arranged in parallel relative to the signal processors; and
controlling the synchronization timing of a first frame frequency of the input image signal and the synchronization timing of a second frame frequency of the image signal whose image size is intended for display.

11. A control method of an image pickup apparatus including an image pickup unit, a plurality of signal processors, each of the signal processors configured to process, in its corresponding at least one frame period, an image signal output by the image pickup unit, and a display configured to display an image being shot, the method comprising the steps of:
storing in a memory, in each frame period, the image signal processed by the signal processors;
reading and outputting the image signal stored in the memory;
changing the image size of the image signal to an image size intended for display and then outputting the image signal on the display by the signal processor for the display arranged in parallel relative to the signal processors; and
controlling the synchronization timing of a first frame frequency corresponding to the driving cycle of the image pickup unit and the synchronization timing of a second frame frequency corresponding to the driving cycle of the display.

12. An image signal processing apparatus including a plurality of signal processors connected parallel to each other, each of the signal processors being and configured to process an input image signal, the image signal processing apparatus comprising:
a memory configured to store, in each frame period, the image signal processed by the signal processors;
a signal processor for the display arranged in parallel relative to the signal processors, and configured to change the image size of the image signal to an image size intended for display and then to output the image signal; and
a controller configured to control the synchronization timing of a first frame frequency of the output image signal and the synchronization timing of a second frame frequency of the image signal whose image size is intended for display.

13. The image signal processing apparatus according to claim 12, wherein the signal processor for the display includes an image resizer configured to perform image reduction processing of the input image signal branched upstream from each of the first signal processor and the second signal processor.

14. The image signal processing apparatus according to claim 12, wherein the signal processors are configured to perform at least one of the noise reduction processing, an image signal conversion processing, the image distortion correction processing, or a camera shake correction processing.

15. The image signal processing apparatus according to claim 12, wherein the signal processor for the display is configured to convert the image signal whose image size has been resized into a luminance signal and color difference signals, to write the luminance signal and the color difference signals in a memory bank of the memory, and then to process the luminance signal and the color difference signals, both of which are read from the memory bank, to be those intended for use at the time of display.

16. The image signal processing apparatus according to claim 15, wherein the first frame frequency observed when an image signal is written in the memory bank and the second frame frequency observed when the image signal is read from the memory bank are different.

17. The image signal processing apparatus according to claim 13 further comprising:

a second memory configured to store the input image signal, wherein the signal processors read the input image signal from the second memory and process the input image signal, and wherein the image resizer performs the image reduction processing of the input image signal before the input image signal is stored in the second memory.

18. An image pickup apparatus including an image pickup unit, a plurality of signal processors connected parallel to each other, each of the signal processors configured to process an image signal output by the image pickup unit, and a display configured to display an image being shot, the image pickup apparatus comprising:

a memory configured to store, in each frame period, the image signal processed by the signal processors;

a signal processor for the display arranged in parallel relative to the signal processors, and configured to change the image size of the image signal to an image size intended for display and then to output the image signal on the display; and a controller configured to control the synchronization timing of a first frame frequency corresponding to the driving cycle of the image pickup unit and the synchronization timing of a second frame frequency corresponding to the driving cycle of the display.

19. A control method of an image signal processing apparatus performed by the image signal processing apparatus, the image signal processing apparatus including a plurality of signal processors connected parallel to each other, each of the signal processors being configured to process an input image signal, the method comprising the steps of:

storing in a memory, in each frame period, the image signal processed by the signal processors;

reading and outputting the image signal stored in the memory;

changing the image size of the image signal to an image size intended for display and then outputting the image signal by the signal processor for the display arranged in parallel relative to the signal processors; and controlling the synchronization timing of a first frame frequency of the input image signal and the synchronization timing of a second frame frequency of the image signal whose image size is intended for display.

20. A control method of an image pickup apparatus including an image pickup unit, a plurality of signal processors connected parallel to each other, each of the signal processers configured to process an image signal output by the image pickup unit, and a display configured to display an image being shot, the method comprising the steps of:

storing in a memory, in each frame period, the image signal processed by the signal processors;

reading and outputting the image signal stored in the memory;

changing the image size of the image signal to an image size intended for display and then outputting the image signal on the display by the signal processor for the display arranged in parallel relative to the signal processors; and controlling the synchronization timing of a first frame frequency corresponding to the driving cycle of the image pickup unit and the synchronization timing of a second frame frequency corresponding to the driving cycle of the display.

* * * * *